US012107905B2

(12) United States Patent
Liu et al.

(10) Patent No.: US 12,107,905 B2
(45) Date of Patent: Oct. 1, 2024

(54) DATA COMMUNICATION METHOD, APPARATUS, AND DEVICE, STORAGE MEDIUM, AND COMPUTER PROGRAM PRODUCT

(71) Applicant: TENCENT TECHNOLOGY (SHENZHEN) COMPANY LIMITED, Guangdong (CN)

(72) Inventors: Weian Liu, Shenzhen (CN); Zhicheng Lei, Shenzhen (CN); Tao Wang, Shenzhen (CN); Hu Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/954,993

(22) Filed: Sep. 28, 2022

(65) Prior Publication Data

US 2023/0013371 A1 Jan. 19, 2023

Related U.S. Application Data

(63) Continuation of application No. PCT/CN2021/123016, filed on Oct. 11, 2021.

(30) Foreign Application Priority Data

Oct. 29, 2020 (CN) .......................... 202011178365.5

(51) Int. Cl.
*G06F 9/54* (2006.01)
*G06F 9/06* (2006.01)
(Continued)

(52) U.S. Cl.
CPC ........ *H04L 65/402* (2022.05); *G06F 9/44526* (2013.01); *H04L 51/56* (2022.05)

(58) Field of Classification Search
CPC ..... H04L 65/402; H04L 51/56; H04L 51/046; H04L 65/1059; H04L 65/1069;
(Continued)

(56) References Cited

U.S. PATENT DOCUMENTS 7,877,265 B2 * 1/2011 Pasquale ............ G06Q 30/0282
705/347
7,962,644 B1 * 6/2011 Ezerzer ............... H04M 3/5191
370/352
(Continued)

FOREIGN PATENT DOCUMENTS

CN 105681723 A 6/2016
CN 110138937 A * 8/2019 ............ H04M 1/026
(Continued)

OTHER PUBLICATIONS

Chinese Office Action for Chinese Patent Application 202011178365.5 dated Aug. 2, 2022.
(Continued)

*Primary Examiner* — Thu V Nguyen
*Assistant Examiner* — Golam Mahmud
(74) *Attorney, Agent, or Firm* — Sughrue Mion, PLLC

(57) ABSTRACT

A data communication method, apparatus, and device, a computer-readable storage medium, and a computer program product. The method includes: generating a communication request in response to a trigger operation for a communication control in an embedded subroutine, the communication request being used for requesting to communicate with a target user associated with the embedded subroutine, invoking a communication service plug-in according to the communication request, and communicating with the target user in the embedded subroutine through a first service function provided by the communication service plug-in, and performing, in response to a trigger
(Continued)

operation for a second service function provided by the communication service plug-in, service interaction with the target user in the embedded subroutine through the second service function in a process of communicating with the target user.

20 Claims, 14 Drawing Sheets

(51) Int. Cl.
*G06F 9/445* (2018.01)
*G06F 9/46* (2006.01)
*H04L 51/56* (2022.01)
*H04L 65/402* (2022.01)

(58) Field of Classification Search
CPC ... H04L 51/52; H04L 65/403; G06F 9/44526; H04M 7/006
See application file for complete search history.

(56) References Cited

U.S. PATENT DOCUMENTS

| | | | |
|---|---|---|---|
| 8,099,598 B1* | 1/2012 | Liu | H04L 9/083 380/255 |
| 8,285,856 B1 | 10/2012 | Jain et al. | |
| 9,118,760 B2* | 8/2015 | Atef | H04L 67/34 |
| 9,262,771 B1* | 2/2016 | Patel | G06Q 20/3278 |
| 2004/0230438 A1* | 11/2004 | Pasquale | G06Q 30/0217 705/346 |
| 2005/0165849 A1* | 7/2005 | Moradi | H04L 65/612 |
| 2008/0034381 A1* | 2/2008 | Jalon | G06F 16/168 719/329 |
| 2010/0083098 A1* | 4/2010 | Leme | G06F 16/958 715/234 |
| 2014/0195921 A1* | 7/2014 | Grosz | G06Q 30/0631 715/738 |
| 2015/0312200 A1* | 10/2015 | Brav | G06F 40/284 709/206 |
| 2018/0343318 A1* | 11/2018 | Yuan | H04L 67/306 |
| 2019/0310835 A1* | 10/2019 | Gong | G06F 8/41 |
| 2022/0214932 A1* | 7/2022 | Cui | G06F 9/54 |

FOREIGN PATENT DOCUMENTS

| | | | | |
|---|---|---|---|---|
| CN | 111356024 A | | 6/2020 | |
| CN | 111371676 A | | 7/2020 | |
| CN | 111447133 A | | 7/2020 | |
| CN | 111680140 A | | 9/2020 | |
| CN | 112291238 A | | 1/2021 | |
| KR | 20140055929 A | * | 5/2014 | ........ H04M 1/72484 |
| WO | WO-2014109560 A1 | * | 7/2014 | ......... G06F 17/3089 |

OTHER PUBLICATIONS

Chinese Office Action for Chinese Patent Application 202011178365.5 dated Mar. 31, 2022.
International Search Report for PCT/CN2021/123016 dated Jan. 4, 2022.
Written Opinion for PCT/CN2021/123016 dated Jan. 4, 2022.

* cited by examiner

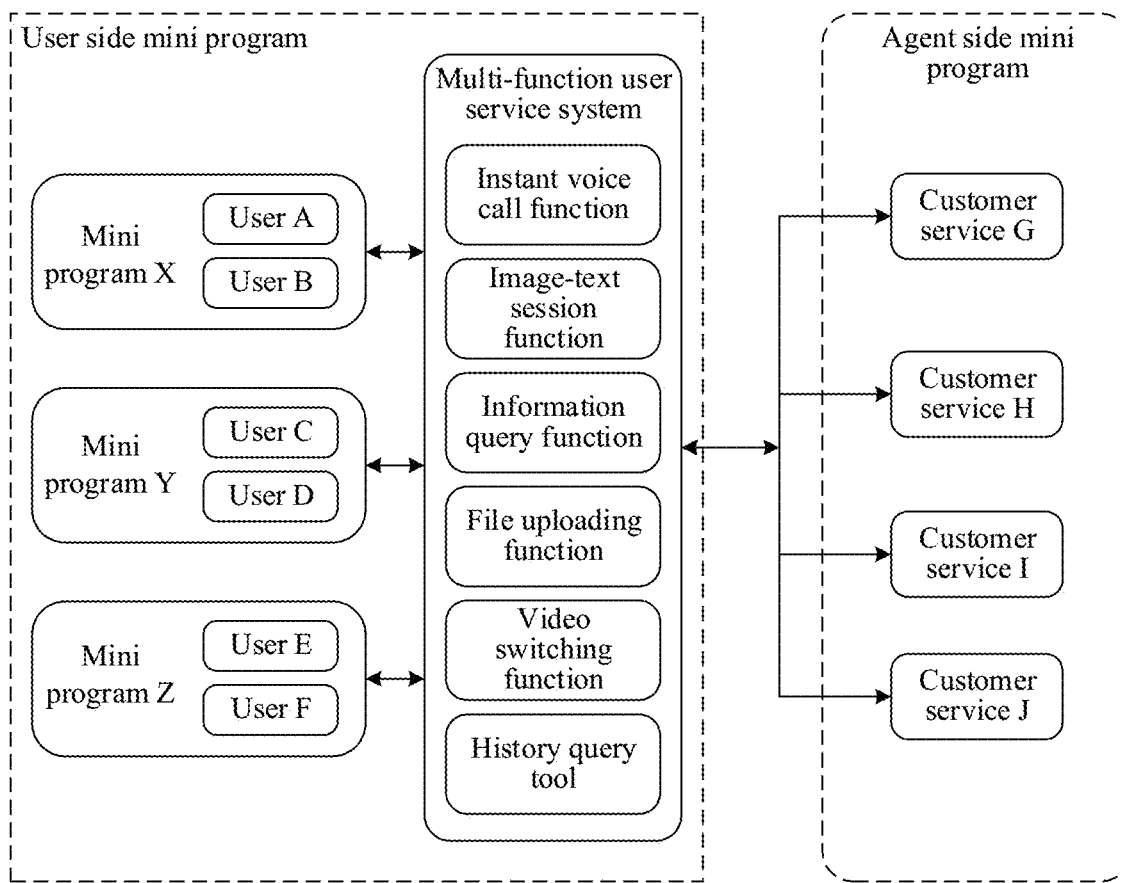

FIG. 3

A user terminal generates a communication request in response to a trigger operation for a communication control in an embedded subroutine, where the communication request is used for requesting to communicate with a target user associated with the embedded subroutine / S101

Invoke a communication service plug-in according to the communication request, and communicate with the target user in the embedded subroutine through a first service function provided by the communication service plug-in / S102

Perform, in response to a trigger operation for a second service function provided by the communication service plug-in, service interaction with the target user in the embedded subroutine through the second service function in a process of communicating with the target user / S103

FIG. 4

DATA COMMUNICATION METHOD, APPARATUS, AND DEVICE, STORAGE MEDIUM, AND COMPUTER PROGRAM PRODUCT

CROSS-REFERENCE TO RELATED APPLICATION(S)

This application is a continuation application of International Application No. PCT/CN2021/123016, filed on Oct. 11, 2021, which claims priority to Chinese Patent Application No. 202011178365.5 filed with the China National Intellectual Property Administration on Oct. 29, 2020, the disclosures which are incorporated by reference in their entireties.

FIELD

The disclosure relates to the field of internet technologies, and in particular, to a data communication method, apparatus, and device, a computer-readable storage medium, and a computer program product.

BACKGROUND

With the improvement of internet technology, more and more enterprises transform the service market into a network-based service market. How to resolve the problem of a remote user connecting to a server, communications system quickly, efficiently, and at low cost and other problems is a major challenge faced by many enterprises.

Currently, a voice call between a user and enterprise customer service is mainly implemented through traditional fixed telephone or Interactive Voice Response (IVR) telephone. When contacting the enterprise customer service through the traditional fixed telephone, the user needs to bear the cost of making calls, which is relatively high; and a manner of the IVR voice call belongs to an automatic response language system. The user can operate the smart phone through a system prompt to obtain required information or enter the service of manual customer service. However, the process is complicated and the communication efficiency between the user and the enterprise customer service is low.

SUMMARY

Some embodiments of the disclosure may provide a data communication method, apparatus, and device, a computer-readable storage medium, and a computer program product, which can not only save the communication cost for a user, but also improve the communication efficiency.

According to some embodiments a data communication method, performed by a computer device, may be provided, the method including: generating a communication request in response to a trigger operation for a communication control in an embedded subroutine, the communication request being used for requesting to communicate with a target user associated with the embedded subroutine; invoking a communication service plug-in according to the communication request, and communicating with the target user in the embedded subroutine through a first service function provided by the communication service plug-in; and performing, in response to a trigger operation for a second service function provided by the communication service plug-in, service interaction with the target user in the embedded subroutine through the second service function in a process of communicating with the target user.

Some embodiments may provide a data communication method, performed by a backend server, the backend server including a communication service plug-in, and the method including: obtaining a communication request transmitted by a user terminal through an embedded subroutine; the communication request being used for representing that the user terminal requests to communicate with a target user associated with the embedded subroutine; invoking a first service function in the communication service plug-in according to the communication request, and providing a communication service for a user terminal in the embedded subroutine and a target terminal through the first service function, where the target terminal is a terminal to which the target user belongs; and providing, in response to a trigger operation for a second service function provided by the communication service plug-in, service interaction service for the user terminal in the embedded subroutine and the target terminal through the second service function in a process in which the user terminal communicates with the target user.

According to some embodiments a data communication apparatus may be provided, the apparatus including: a first response module, configured to generate a communication request in response to a trigger operation for a communication control in an embedded subroutine, the communication request being used for requesting to communicate with the target user associated with the embedded subroutine; a first invoking module, configured to invoke a communication service plug-in according to the communication request, and communicate with the target user in the embedded subroutine through a first service function provided by the communication service plug-in; and a second response module, configured to perform, in response to a trigger operation for a second service function provided by the communication service plug-in, service interaction with the target user in the embedded subroutine through the second service function in a process of communicating with the target user.

Some embodiments may provide a data communication apparatus, the apparatus being run on a backend server, the backend server including a communication service plug-in, and the apparatus may include: a first obtaining module, configured to obtain a communication request transmitted by a user terminal through an embedded subroutine; the communication request being used for representing that the user terminal requests to communicate with a target user associated with the embedded subroutine; and a first providing module, configured to invoke a first service function in the communication service plug-in according to the communication request, and provide a communication service for a user terminal in the embedded subroutine and a target terminal through the first service function, where the target terminal is a terminal to which the target user belongs; and a providing module, configured to provide, in response to a trigger operation for a second service function provided by the communication service plug-in, service interaction service for the user terminal in the embedded subroutine and the target terminal through the second service function in a process in which the user terminal communicates with the target user.

According to some embodiments, a computer device may be provided, the computer device including a processor, a memory, and a network interface; the processor being connected to the memory and the network interface, the network interface being configured to provide a data communication function, the memory being configured to store a computer program, and the processor being configured to invoke the computer program to perform the data communication method in the foregoing embodiments.

According to some embodiments, a non-transitory computer-readable storage medium, storing a computer program, may be provided, the computer program including program instructions, the program instructions, when executed by a processor, performing the data communication method in the foregoing embodiments.

According to some embodiments a computer program product or a computer program may be provided, the computer program product or the computer program including computer instructions, the computer instructions being stored in a computer-readable storage medium, a processor of a computer device reading the computer instructions from the computer-readable storage medium, and the processor executing the computer instructions to cause the computer device to perform the data communication method in some embodiments.

The embodiments have the following beneficial effects:

In some embodiments, when the user needs to communicate with the target user (such as enterprise customer service), the user can first start an embedded subroutine corresponding to the enterprise in the corresponding user terminal, and then trigger a communication control in the embedded subroutine. The user terminal can generate a communication request based on the trigger operation, and the communication request is generated in the embedded subroutine and does not jump to other communication applications of the user terminal; the user terminal invokes the communication service plug-in according to the communication request, and allows the user to communicate with the target user through the embedded subroutine through the first service function provided by the communication service plug-in. The user communicates with the target user (such as enterprise customer service) in the embedded subroutine. The communication manner is not transmitted through the traditional telephone network of the telecommunication operator, but through the internet, so the communication cost of the user can be reduced; and in addition, in a process of communicating with the target user, the user can further perform other service interaction with the target user in the embedded subroutine through the second service function provided by the communication service plug-in, so that the two users can efficiently implement service interaction in the communication process. That is, communication does not need to be interrupted while implementing other service interaction, which can not only effectively reduce the communication cost of the user, but also improve the communication efficiency between the user and the target user (such as enterprise customer service).

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 3 is a schematic structural diagram of a multi-function user service system for accessing a plurality of enterprise mini programs according to some embodiments.

FIG. 4 is a schematic flowchart of a data communication method according to some embodiments.

DESCRIPTION OF EMBODIMENTS

The technical solutions in some embodiments are clearly and completely described in the following with reference to the accompanying drawings in some embodiments. Apparently, the described embodiments are merely some rather than all of some embodiments. All other embodiments obtained by a person skilled in the art based on some embodiments without creative efforts shall fall within the protection scope of the disclosure.

In the following descriptions, related "some embodiments" describe a subset of all possible embodiments. However, it may be understood that the "some embodiments" may be the same subset or different subsets of all the possible embodiments, and may be combined with each other without conflict.

For ease of understanding, some nouns are briefly explained as follows:

1. Voice over Internet Protocol (VoIP), also referred to as Voice over IP, is novel telephone communication implemented through the internet or other networks using IP technology. In some embodiments, messages are transmitted and received by using an enterprise Transmission Control Protocol/Internet Protocol (TCP/IP) internet connection. The VoIP technology converts audio signals from voice to digital data, which is transmitted to a destination through broadband internet.

2. Real-Time Communication (RTC) is an audio and video call manner based entirely on internet transmission.

3. WebSocket is a protocol for full-duplex communication over a single TCP connection, which causes data exchange between a client and a server to be simpler and allows the server to actively push data to the client. In a WebSocket Application Programming Interface (API), the browser and the server only need to complete handshake once, and a persistent connection can be directly created between the browser and the server, and two-way data communication can be performed.

Figure 1:
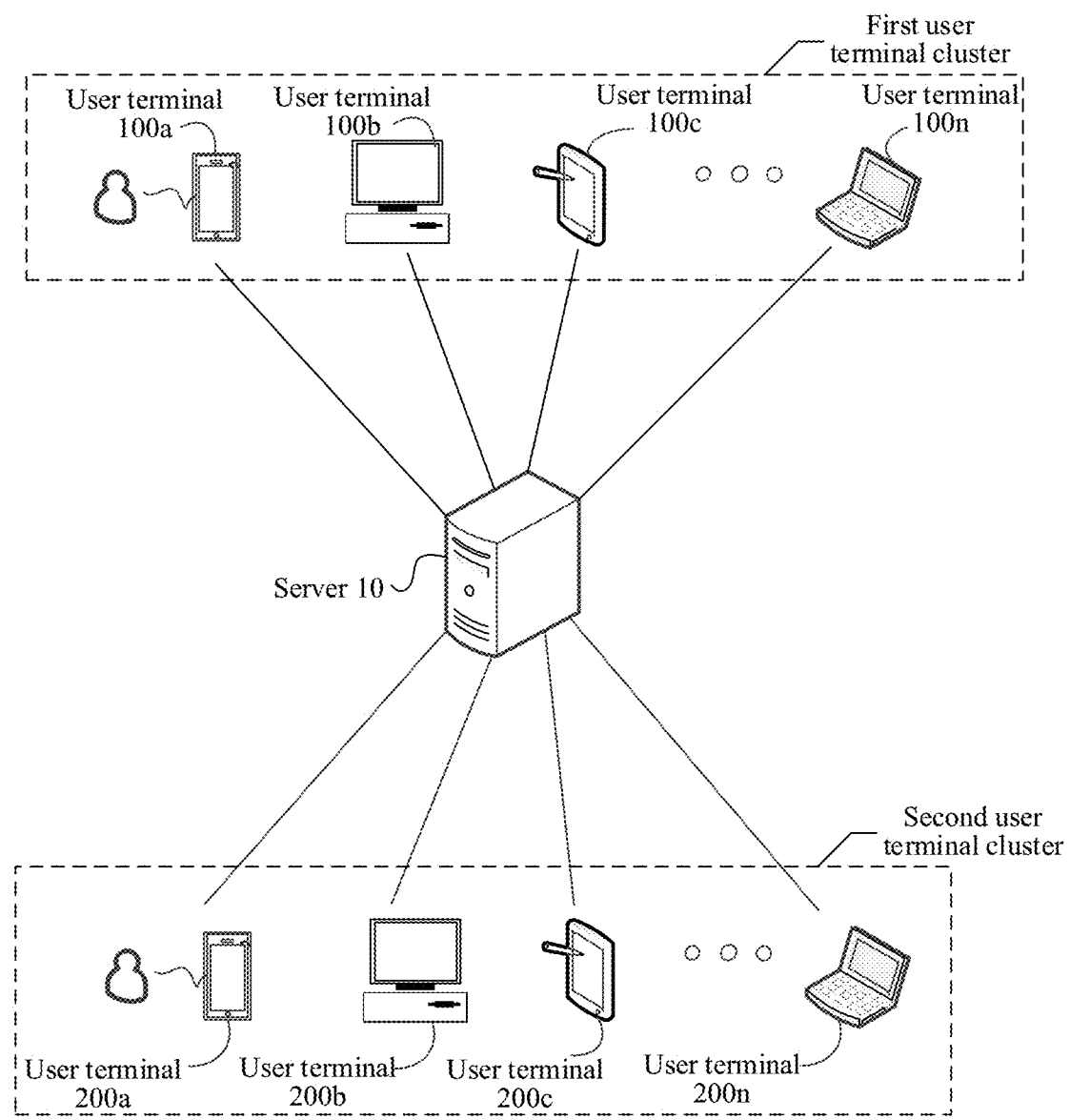
FIG. 1 is a schematic diagram of a network architecture according to some embodiments.

FIG. 1 is a schematic diagram of a network architecture according to some embodiments. As shown in FIG. 1, the network architecture may include a server 10, a first user terminal cluster, and a second user terminal cluster. The first user terminal cluster may include one or more user terminals, and the quantity of user terminals is not limited herein. As shown in FIG. 1, the first user terminal cluster may specifically include a user terminal 100a, a user terminal 100b, a user terminal 100c, . . . , and a user terminal 100n. As shown in FIG. 1, the user terminal 100a, the user terminal 100b, the user terminal 100c, . . . , and the user terminal 100n may each establish a network connection to the server 10, so that each user terminal may implement data interaction with the server 10 through the network connection.

The second user terminal cluster may include one or more user terminals, and the quantity of user terminals is no limited herein. The second user terminal cluster may specifically include a user terminal 200a, a user terminal 200b, a user terminal 200c, . . . , and a user terminal 200n. As shown in FIG. 1, the user terminal 200a, the user terminal 200b, the user terminal 200c, . . . , and the user terminal 200n may each establish a network connection to the server 10, so that each user terminal may implement data interaction with the server 10 through the network connection.

It is to be understood that the first user terminal cluster in FIG. 1 can be connected to the second user terminal cluster through a network, so that any user terminal in the first user terminal cluster can be connected through the network and perform data interaction with any user terminal in the second user terminal cluster. For example, the user terminal 100a may perform data interaction with the user terminal 200a through the network connection.

As shown in FIG. 1, the server 10 may be a server corresponding to an application client. The server 10 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Each user terminal in the first user terminal cluster and the second user terminal cluster may include: smart terminals with data processing functions such as a smart phone, a tablet computer, a notebook computer, a desktop computer, a wearable device, smart home appliance, a head-mounted device, and an in-vehicle device. It is to be understood that a target application (i.e., application client) may be installed in each user terminal in the user terminal cluster shown in FIG. 1. When run in each user terminal, the application clients can respectively perform data interaction with the server 10 shown in FIG. 1. The application client may be an independent client, a mini program integrated in a specific client, or a plug-in client invoked by the mini program, which is not limited herein. The mini program is an application that does not need to be downloaded and installed by the user terminal. The mini program realizes a dream, that is, an application is "within reach". The user can open the application by scanning or searching through the user terminal. An idea of "leaving after using" is also embodied, and the user does not need to worry about whether too many applications are installed. The application is ubiquitous and is always available, without being installed or uninstalled.

The application client provided in some embodiments may include a client with an instant communication function of a first application platform, such as a social client. The application client may include a client of a second application platform. The client of the second application platform can be embedded in the client of the first application platform, and the client of the second application platform can invoke a communication service plug-in, such as a multimedia client (for example, a video client), an entertainment client (for example, a game client), an education client, a livestreaming client, a news client, a shopping client (for example, an e-commerce client), or the like. The application client may include a client of a third application platform (an application platform that provides the communication service plug-in), and the client of the third application platform may be invoked by the client of the second application platform.

It is to be understood that, the communication service plug-in refers to a software development tool kit that can implement an instant communication function between users in the application client. The communication service plug-in may include functions such as instant voice communication, instant video communication, an online image-text session, online information query, and a file uploading tool. The server 10 may be a server corresponding to the client of the third application platform. The first application platform and the second application platform are different.

For ease of understanding, in some embodiments, one user terminal is selected from the first user terminal cluster shown in FIG. 1 as a first user terminal. For example, the user terminal 100a shown in FIG. 1 may be used as the first user terminal. An application client (for example, a client N) of the second application platform may be run in the first user terminal. It is to be understood that, in some embodiments, a user who accesses the client N through a user account 1 in the first user terminal may be referred to as a first user, that is, the first user may be a user who uses the first user terminal. In some embodiments, the client N that is run in the first user terminal may be referred to as a first client. In this case, the first user terminal can implement data interaction with the server 10 through the communication service plug-in invoked in the first client.

In some embodiments, a user who accesses the client N through a user account 2 may be referred to as a second user. A user terminal corresponding to the second user may be referred to as a second user terminal. In some embodiments, one user terminal may be arbitrarily selected as the second user terminal in the second user terminal cluster shown in FIG. 1. For example, the user terminal 200a shown in FIG. 1 may be used as the second user terminal. In some embodiments, the client N that is run in the second user terminal may be referred to as a second client. In this case, the second user terminal can invoke the communication service plug-in through the second client to implement data interaction with the server 10, and a plug-in system corresponding to the communication service plug-in is deployed in the server 10. Both the first client and the second client can invoke a client with the same communication service plug-in. For example, the first client and the second client may be the client N. Because both the first client and the second client can invoke the communication service plug-in with the instant communication function, the first user and the second user can perform instant communication in the client N through the server 10 corresponding to the communication service plug-in.

Figure 2:
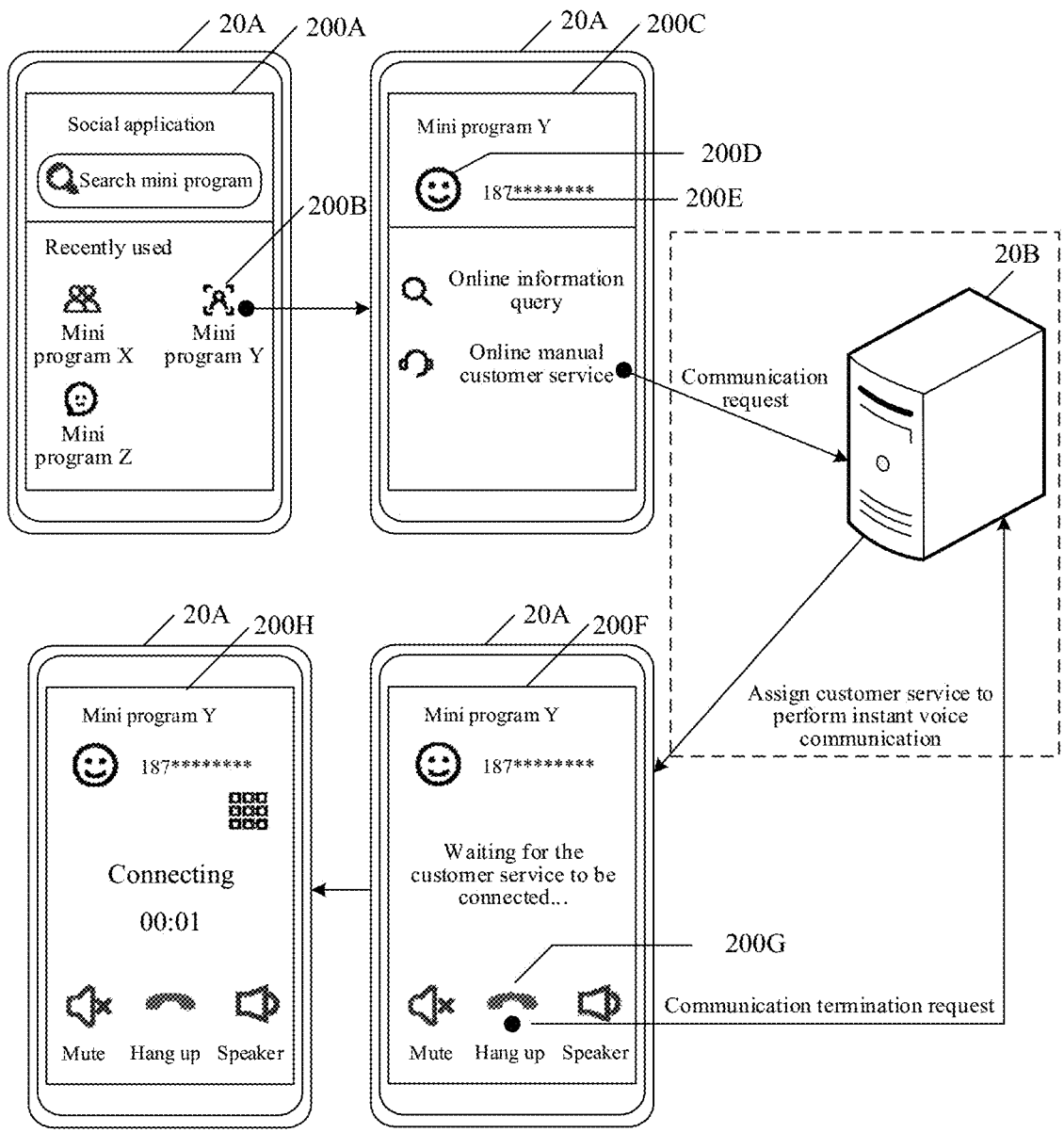
FIG. 2 is a schematic diagram of a scenario of data communication according to some embodiments.

FIG. 2 is a schematic diagram of a scenario of data communication according to some embodiments. Using a target application arranged on the user terminal as a social application as an example, as shown in FIG. 2, the user first triggers the social application in the user terminal 20A, and then searches for the embedded subroutine in the social application. As shown in a first service page 200A, the user recently searches for three embedded subroutines through social applications, namely a mini program X, a mini program Y, and a mini program Z. The first service page 200A may include application names of the embedded subroutine, such as the mini program X, the mini program Y, and the mini program Z, and may further include application icons of the embedded subroutine, for example, an icon corresponding to the mini program X, an icon corresponding to the mini program Y (an icon 200B in FIG. 2), and an icon corresponding to the mini program Z.

The user terminal 20A displays a second service page 200C in response to a trigger operation for the mini program Y. Because the mini program Y is embedded in the social application, the second service page 200C displayed by the user terminal 20A occurs in the social application. The second service page 200C may include a user identifier 200E and a user avatar 200D of the user in the mini program Y. The user avatar 200D can be changed, and the user identifier 200E can be a mobile phone number of the user (for example, 187******** shown in FIG. 2), the ID number of the user, or the e-mail of the user. A scope of the user identifier 200E is not limited herein, provided that the scope of the user identifier 200E is unique. On the second service page 200C, the mini program Y can provide the user with online instant communication through a function provided by a mini program plug-in (i.e. the communication service plug-in), for example, online information query and online manual customer service shown in FIG. 2. Next, a description is made by using the target user as the manual customer service as an example.

The user terminal 20A, in response to a trigger operation for the online manual customer service (i.e. a communication control), as shown in FIG. 2, can generate a communication request. The communication request is used for requesting online instant voice communication with the manual customer service of the mini program Y; and the user terminal 20A can invoke the communication service plug-in in the server 20B according to the communication request, that is, transmit the communication request to the server 20B. After receiving the communication request, the communication service plug-in in the server 20B assigns the manual customer service of the mini program Y to the user terminal 20A, and provides the first service function (i.e., an instant voice call function) so that the assigned manual customer service can perform instant voice communication with the user. As shown in FIG. 2, the user terminal 20A displays a third service page 200F (i.e., the communication waiting page). In this case, the communication waiting page may indicate that the server 20B is looking for a service terminal (i.e., a terminal corresponding to the manual customer service) in an idle service state for the user terminal 20A, and may also indicate that the service terminal whose service state is in the idle state is waiting for the manual customer service to answer the instant voice communication, and a scenario is not limited herein.

If the user clicks a hang-up control 200G (i.e., cancel control) on the third service page 200F in a process of waiting for the manual customer service to answer the communication, the user terminal 20A cancels a display of the communication waiting page 200F, and transmits a communication termination request to the server 20B, so that the server 20B cancels the communication request according to the communication termination request. If there is a target manual customer service in an idle state in the manual customer service of the mini program Y, and the server 20B successfully creates a communication virtual room for the target terminal (the terminal corresponding to the target manual customer service) and the user terminal 20A, then the user terminal 20A can display a fourth service page 200H (i.e., the communication call page). In this case, the user can perform an instant voice call with the target manual customer service through the instant voice call function provided by the communication service plug-in.

The user terminal 20A in FIG. 2 may be any user terminal in the first user terminal cluster shown in FIG. 1, for example, the user terminal 100a; the target terminal may be any user terminal in the second user terminal cluster shown in FIG. 1, for example, the user terminal 200a; and the server 20B may be the server 10 shown in FIG. 1.

Based on the above, in some embodiments, the mini program Y is an embedded subroutine in the social application, and the communication service plug-in is a subroutine plug-in. The communication service plug-in, just like various components, can be invoked by the mini program Y. FIG. 3 is a schematic structural diagram of a multi-function user service system for accessing a plurality of enterprise mini programs according to some embodiments. As shown in FIG. 3, using the target user as the enterprise manual customer service (referred to as enterprise customer service) as an example, the multi-function user service system is developed and implemented in the form of a mini program plug-in. The system does not need to be developed repeatedly and can be provided to one or more embedded subroutines. The quantity of embedded subroutines is not limited herein. For example, the mini program X, the mini program Y, and the mini program Z can all be connected to the multi-function user service system. A user A and a user B can embed the mini program X in the social application. In this case, customer service corresponding to a mini program on an agent side (including customer service G, customer service H, customer service I, and customer service J) is the enterprise customer service corresponding to the mini program X; A user C and a user D can embed the mini program Y in the social application. In this case, the customer service corresponding to the mini program on the agent side is the enterprise customer service corresponding to the mini program Y; and a user E and a user F can embed the mini program Z in the social application. In this case, the customer service corresponding to the mini program on the agent side is the enterprise customer service corresponding to the mini program Z. It is to be understood that the social application does not limit an application scope, that is, a social application corresponding to the user A and a social application corresponding to the user C are different, which is not limited in herein, and the quantity of users and the quantity of enterprise customer service are also not limited.

As shown in FIG. 3, the multi-function user service system may include an instant voice call function, an image-text session function, an information query function, a file uploading function, a video switching function, and a history query tool. When the user performs instant voice communication with the enterprise customer service through the instant voice call function, the multi-function user service system can provide the user/enterprise customer service with the file uploading function, so as to perform the online file uploading while implementing the voice communication; the multi-function user service system can further provide the user with an information query function, so as to perform online information query while implementing voice communication; the multi-function user service system can further provide the user/target user with the image-text session function, so as to implement the online image-text session; the multi-function user service system can further provide a video switching function to authenticate the user identity; and the multi-function user service system can further provide the user with a history query function, allowing the user to view historical communication record.

In summary, the communication service plug-in provided in some embodiments greatly reduces the cost of each call and the development cost of the enterprise in terms of scalability, convenience, cost saving, and versatility, and builds an extremely convenient communication bridge for the customer service and the user who work remotely.

It is to be understood that the method provided in some embodiments may be performed by a computer device, and both the first user terminal cluster and the server corresponding to the communication service plug-in shown in FIG. 1 in some embodiments may be computer devices. The computer device includes, but is not limited to, a user terminal or a server. The server may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The user terminal may be a smartphone, a tablet computer, a notebook computer, a desktop computer, a smart speaker, a smart TV, a smart watch, or the like, but is not limited thereto. In some embodiments, the quantity of user terminals and servers is not limited, and the user terminal and the server can be directly or indirectly connected through wired or wireless communication manner, which is not limited herein.

For any user terminal in the first user terminal cluster shown in FIG. 1 and any user terminal in the second user terminal cluster, for a specific implementation of implementing the multi-function communication function through the communication service plug-in, reference may be made to embodiments corresponding to FIG. 4 to FIG. 12 below.

FIG. 4 is a schematic flowchart of a data communication method according to some embodiments. As shown in FIG. 4, the method may be performed by a computer device, the computer device includes a user terminal or a server, and the data communication process may include the following operations.

Operation S101. A user terminal generates a communication request in response to a trigger operation for a communication control in an embedded subroutine, where the communication request is used for requesting to communicate with a target user associated with the embedded subroutine.

In actual implementation, a target application (i.e., an application client), such as a social application, is installed in the user terminal, and the user corresponding to the user terminal can perform a trigger operation on the communication control in the embedded subroutine in the target application. The trigger operation may include contact operations such as clicking and long pressing, and may also include non-contact operations such as voice and gesture, which are not limited herein.

The user terminal can respond to the trigger operation, and then can generate a communication request to request the target user associated with the embedded subroutine to perform instant voice communication. For a specific process, reference may be made to the embodiment corresponding to FIG. 2, which is not repeated herein.

Different from a previous communication manner of performing a voice call between the user and the target user (such as enterprise customer service), the instant voice communication shown in some embodiments is not transmitted through the traditional telephone network of the telecommunication operator, but is transmitted through the internet (Voice over IP technology). An RTC audio and video component is used to convert audio and video data into IP data packets, so that the remote user can easily find the target user by dialing the VoIP. By using the instant voice communication shown in some embodiments, on the one hand, the frequency of making calls is not limited, and on the other hand, the communication cost can be saved for the user.

Operation S102. Invoke a communication service plug-in according to the communication request, and communicate with the target user in the embedded subroutine through a first service function provided by the communication service plug-in.

In some embodiments, operation 102 may be implemented in the following manner: displaying a communication waiting page in the embedded subroutine through the first service function provided by the communication service plug-in, where the communication waiting page includes a cancel control; in response to a trigger operation for the cancel control on the communication waiting page, canceling a display of the communication waiting page, and transmitting a communication termination request to a backend server corresponding to the communication service plug-in, so that the backend server cancels the communication request according to the communication termination request; and in response to a confirmation operation of the target user assigned by the communication service plug-in on the communication waiting page, switching the communication waiting page to a communication call page in the embedded subroutine, and communicating with the target user on the communication call page.

In some embodiments, the user terminal can further switch the communication call page to a communication termination page in the embedded subroutine in response to a trigger operation for a termination control on the communication call page; obtain a user evaluation request transmitted by a target terminal through a user evaluation function provided by the communication service plug-in on the communication termination page; and in response to a trigger operation for the user evaluation request, perform an evaluation operation for the target user, obtain user evaluation information corresponding to the evaluation operation, and transmit the user evaluation information to the target terminal through the user evaluation function, where the target terminal is the terminal to which the target user belongs.

Figure 5:
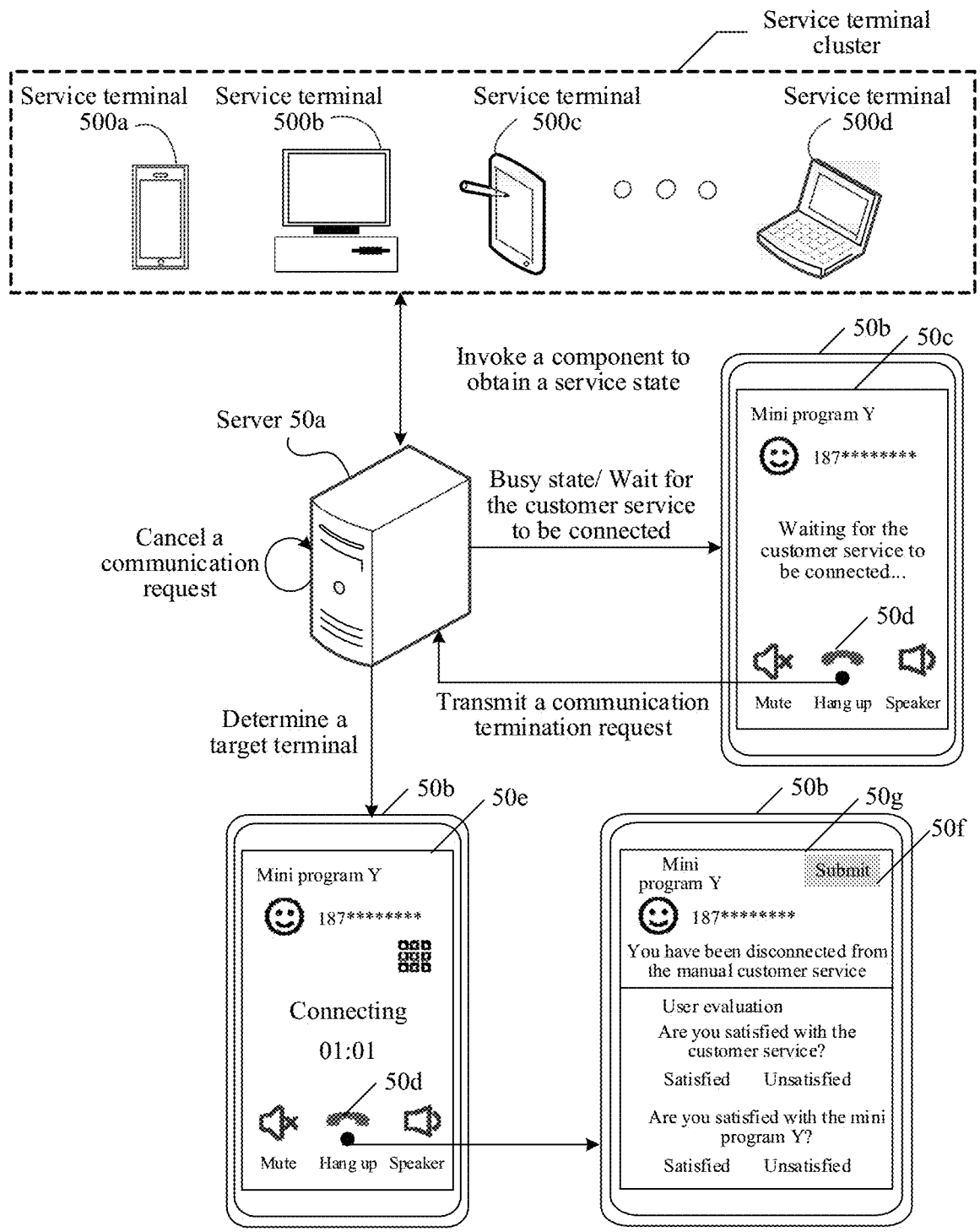
FIG. 5 is a schematic diagram of a scenario of data communication according to some embodiments.

With reference to FIG. 2 to FIG. 5, FIG. 5 is a schematic diagram of a scenario of data communication according to some embodiments. A server 50a in FIG. 5 may be equivalent to a server 20B in FIG. 2. A user terminal 50b in FIG. 5 may be equivalent to a user terminal 20A in FIG. 2. Using the target user as a manual customer service as an example, as shown in FIG. 5, the server 50a invokes a message monitoring component and a message pulling component that are associated with the first service function (i.e., the instant voice call function) according to the communication request generated by the user terminal 50b; and instantly monitors a service state of each service terminal (i.e., the target terminal) in the service terminal cluster of the embedded subroutine (i.e., the mini program Y in FIG. 5) through the message monitoring component, and regularly pulls the service state of each service terminal in the service terminal cluster through the message pulling component. The service terminal cluster is a terminal corresponding to the manual customer service of the mini program Y. As shown in FIG. 5, the service terminal cluster may include one or more service terminals, and the quantity of service terminals is not limited herein. The service terminal cluster may include a service terminal 500a, a service terminal 500b, a service terminal 500c, . . . , and a service terminal 500d. Each service terminal in the service terminal cluster may include: smart terminals with data processing functions such as a smart phone, a tablet computer, a notebook computer, a desktop computer, a wearable device, smart home appliance, a head-mounted device, and an in-vehicle device.

If the service state of none of the service terminals in the service terminal cluster is in the idle state within a time period specified by the system, such as two minutes, that is, within two minutes after the user dials the VoIP, the manual customer service of the mini program Y is in a busy state, the server 50a prompts the user that "the manual customer service of the mini program Y is in a busy state and cannot answer your VoIP". In a process of waiting for the manual customer service to be connected, the user terminal 50b may display a communication waiting page 50c. The communication waiting page 50c may include the user identifier and the user avatar of the user in the mini program Y, may further include prompts, such as "waiting for the customer service to be connected . . . ", and may further include a mute control, a speaker control, and a hang up control 50d (i.e., cancel control). If the user clicks the mute control on the communication waiting page 50c, the user terminal 50b can mute a waiting prompt; and if the user clicks the speaker control on the communication waiting page 50c, the user terminal 50b can play the waiting prompt, and the waiting prompt may be music set by the system or a recording, which is not herein.

If the user clicks the hang-up control on the communication waiting page 50c, the user terminal 50b can generate a communication termination request, and then transmit the communication termination request to the server 50a through the communication service plug-in. The server 50a can cancel the communication request transmitted by the user terminal 50b according to the communication termination request, thereby canceling a voice call queuing sequence number of the user terminal 50b in the mini program Y, withdrawing the user terminal 50b from the voice call, and reducing unnecessary queuing performed by the user. If the server 50a determines that the service state of the service terminal in the service terminal cluster is the idle state through the message monitoring component and the message pulling component, for example, the service terminal 500d is in the idle state, then the server 50a creates a virtual communication room for the service terminal 500d and the user terminal 50b in the mini program Y, and provides the instant voice communication service for the user terminal 50b and the service terminal 500d in the virtual room.

After the user terminal 50b communicates with the service terminal 500d, the user terminal 50b can display a communication call page 50e. Referring to FIG. 5, when the user clicks the hang-up control 50d (i.e., the termination control) on the communication call page 50e, the user terminal 50b can switch the communication call page 50e to a communication termination page 50g. As shown in FIG. 5, the communication termination page 50g may include a user identifier, a user avatar, and a prompt, such as "You have been disconnected from the manual customer service" shown in FIG. 5. In addition, the user terminal 50b can obtain a user evaluation request transmitted by the service terminal 500d through a user evaluation function provided by the communication service plug-in, and the communication termination page 50g can display the user evaluation request. The user evaluation request may include an evaluation of the customer service (such as "Are you satisfied with the customer service?" shown in FIG. 5, evaluation options "Satisfied" and "Unsatisfied", and evaluation of the mini program Y (as shown in FIG. 5 "Are you satisfied with the mini program Y" and evaluation options "Satisfied" and "Unsatisfied"). When the user clicks the evaluation option, the user terminal 50b can obtain user evaluation information corresponding to the evaluation operation. When the user clicks a submit control 50f on the communication termination page 50g, the user terminal 50b can transmit the user evaluation information to the service terminal 500d or other servers corresponding to the mini program Y through a user evaluation function.

It is to be understood that in some embodiments, a termination control and a cancel control are merged into the hang up control 50d in FIG. 5. In practical applications, the cancel control on the communication waiting page 50c and the termination control on the communication call page 50e may be different, which is not limited herein.

In some embodiments, the evaluation in the user evaluation request is indicated by a question of an option. In practical applications, the user evaluation may be other questions, such as a multiple-choice question, a subjective question, or the like, and types of evaluation questions in the user evaluation request are not limited herein.

Service pages (including the first service page 200A, the second service page 200B, the communication waiting page 50c, the communication call page 50e, and the communication termination page 50g) shown in FIG. 2 and FIG. 5 may be generated by the user terminal according to a request (such as a communication request and a communication termination request), or interaction data (such as the target terminal transmitted by the server corresponding to the communication service plug-in, or the like), or may also be generated by the server corresponding to the communication service plug-in according to the request transmitted by the user terminal and the interaction data, or the like, which are not limited herein, and can be set according to an application scenario in practical applications.

Operation S103. Perform, in response to a trigger operation for a second service function provided by the communication service plug-in, service interaction with the target user in the embedded subroutine through the second service function in a process of communicating with the target user.

In some embodiments, the second service function includes a file uploading function; operation S103 may be implemented in the following manner: obtaining a file uploading request transmitted by a target terminal in the embedded subroutine through the file uploading function provided by the communication service plug-in on the communication call page; and in response to a trigger operation for the file uploading request, performing a file uploading operation, obtaining a target file corresponding to the file uploading operation, and transmitting the target file to the target terminal through the file uploading function in the embedded subroutine in the process of communicating with the target user.

In actual implementation, after obtaining the file uploading request, the user terminal generates and displays confirmation information corresponding to a file uploading operation based on the file uploading request. When triggering a confirmation instruction for the displayed confirmation information (the instruction can be triggered by clicking a confirmation button corresponding to the confirmation information), the user receives the trigger operation for the file uploading request; and in another implementation, the file uploading request carries the confirmation information corresponding to the file uploading operation. After obtaining the file uploading request, the user terminal parses the file uploading request to obtain and display the confirmation information, so that the user triggers a confirmation instruction for the confirmation information, and then receives a trigger operation for the file uploading request.

In some embodiments, the second service function includes an image-text session function; operation S103 may be implemented in the following manner: obtaining an image-text confirmation request transmitted by a target terminal in the embedded subroutine through the image-text session function provided by the communication service plug-in on the communication call page, where the image-text confirmation request carries to-be-confirmed image-text information; and in response to a trigger operation for the image-text confirmation request, performing a confirmation operation for the to-be-confirmed image-text information, obtaining an image-text confirmation reply message corresponding to the confirmation operation, and transmitting the image-text confirmation reply message to the target terminal through the image-text session function in the embedded subroutine in the process of communicating with the target user.

In actual implementation, after obtaining the image-text confirmation request, the user terminal parses the image-text confirmation request to obtain and display the to-be-confirmed image-text information, so that the user triggers a confirmation instruction for the to-be-confirmed image-text information, and then receives the trigger operation for the image-text confirmation request.

In some embodiments, the second service function includes a video session function; operation S103 may be implemented in the following manner: obtaining a video session request transmitted by a target terminal in the embedded subroutine through the video session function provided by the communication service plug-in on the communication call page; and in response to a trigger operation for the video session request, switching a communication manner on the communication call page to a video communication manner in the embedded subroutine, and performing video communication with the target user in the video communication manner.

In actual implementation, after obtaining the video session request, the user terminal generates and displays confirmation information being switched corresponding to a communication manner based on the video session request. When triggering a confirmation instruction for the confirmation information (the instruction can be triggered by clicking a confirmation button corresponding to the confirmation information), the user receives the trigger operation for the video session request; and in another implementation, the video session request carries the confirmation information being switched corresponding to the communication manner. After obtaining the video session request, the user terminal parses the video session request to obtain and display the confirmation information, so that the user triggers a confirmation instruction for the confirmation information, and then receives a trigger operation for the video session request.

In some embodiments, the user terminal may further generate a historical communication query request in response to a trigger operation for a historical communication query control in the embedded subroutine, where the historical communication query request is used for requesting to query historical communication record between historical users associated with the embedded subroutine; and the historical users include the target user; invoke the communication service plug-in according to the historical communication query request, and transmit the historical communication query request to a backend server corresponding to the communication service plug-in through a communication record query function provided by the communication service plug-in; and obtain the historical communication record requested by the historical communication query request in the embedded subroutine through the communication record query function.

Some embodiments proposes a multi-function user service solution based on the mini program plug-in, which is mainly applied to a voice communication service scenario between the user and the target user (such as the manual customer service), thereby resolving the problem of simplification of communication between the two parties in a single service mode. The solution provides a multi-function communication service mode, and the user can perform operations such as data uploading, service inquiry, image-text session, and video switching during the call.

Figure 6:
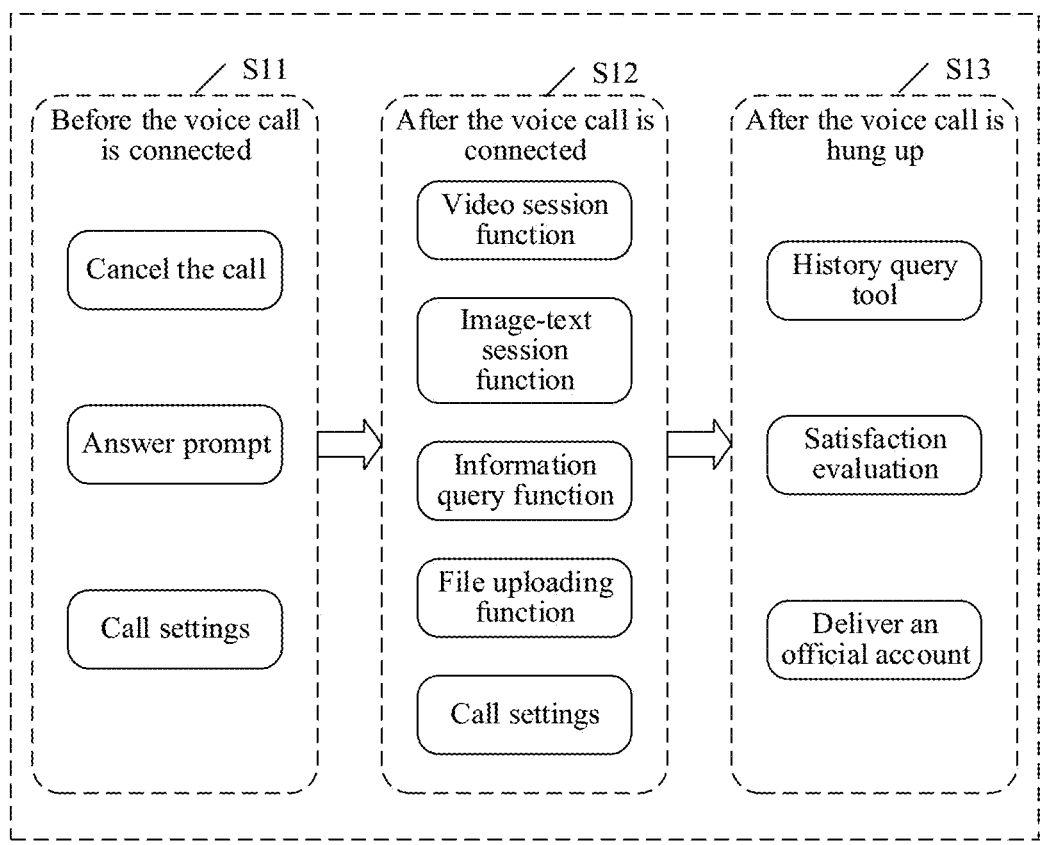
FIG. 6 is a schematic flowchart of a data communication method according to some embodiments.

FIG. 6 is a schematic flowchart of a data communication method according to some embodiments. Using the target user as the manual customer service as an example, as shown in FIG. 6, an overall flow of the data communication method may include operation S11 to operation S13.

Operation S11. Before the instant voice communication is connected, the user provides that the user terminal can display/play a waiting prompt configured by the communication service plug-in when the user terminal is waiting for the manual customer service to answer. The user can operate call settings on the communication waiting page to select whether to turn on the speaker or to mute after the manual customer service answers, or can hang up the call by triggering the cancel control, so that the backend server cancels queuing assignment of the user terminal, causing the user terminal to exit the instant VoIP, and reducing unnecessary queuing in the embedded subroutine.

Operation S12. After the instant voice communication is connected, the user can operate the call settings. During the instant voice communication, the manual customer service delivers a corresponding service function message according to a service processing requirement of the user, so as to perform multiple information communication with the user.

When user data files need to be uploaded (such as uploading authentication data, ID documents, or the like), the manual customer service can transmit a file uploading request to the user terminal through the file uploading function provided by the communication service plug-in; the user can simultaneously perform instant voice communication with the manual customer service and upload files or data (i.e., target file) through the file uploading function and the instant voice call function, and then transmit the target file to the target terminal through the file uploading function in the embedded subroutine; and after receiving the target file, the manual customer service can immediately perform voice communication with the user for feedback.

For operations that require the user to check information, the communication service plug-in can provide the user with an information query function for the user to process during instant voice communication or after the communication ends. For some information such as certificate number information that is difficult to remember by the manual customer service or special character information that the user cannot express clearly, the user can view the image-text confirmation request transmitted by the target terminal in the embedded subroutine through the image-text session function provided by the communication service plug-in.

Figure 7:
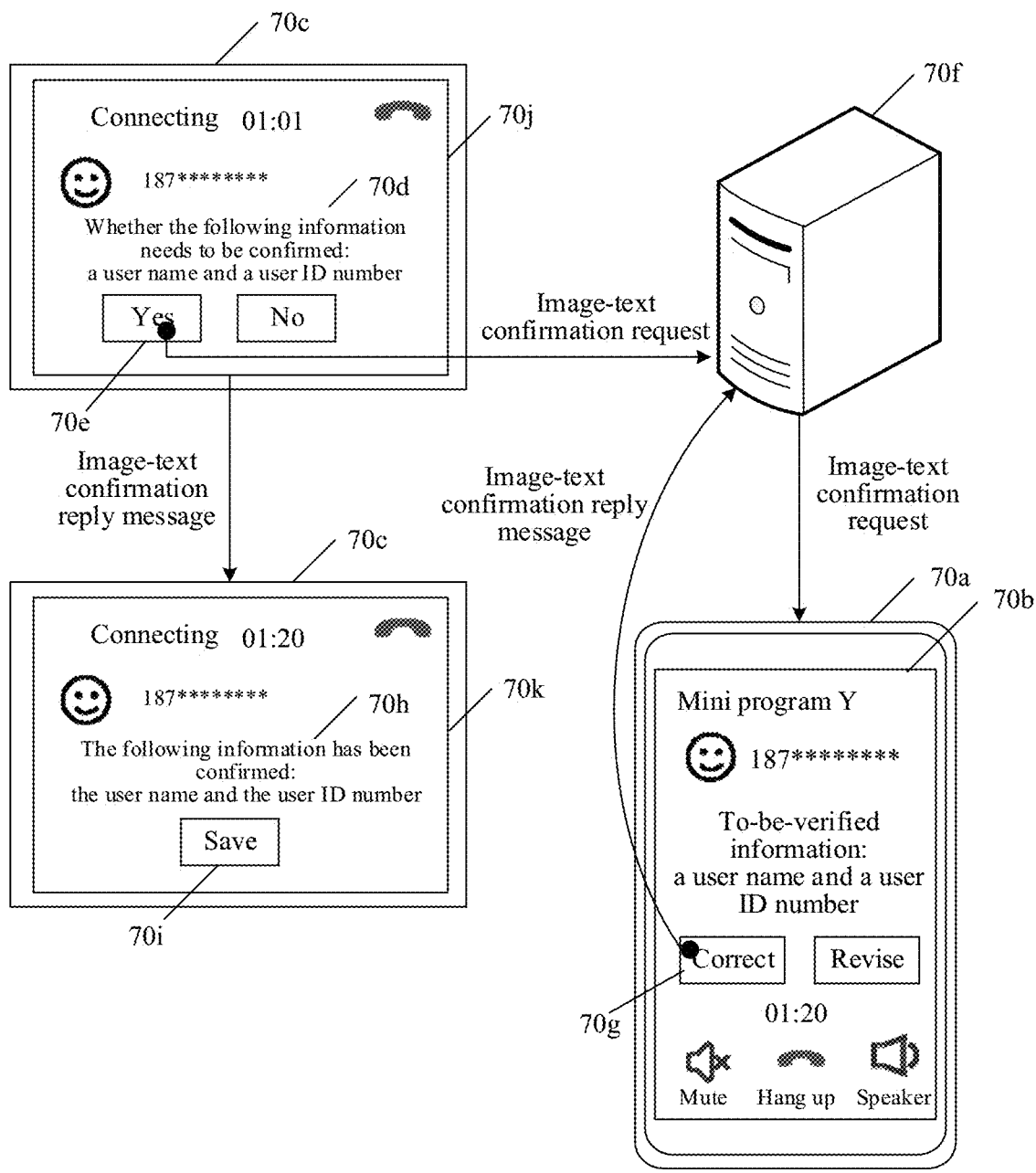
FIG. 7 is a schematic diagram of a scenario of data communication according to some embodiments.

FIG. 7 is a schematic diagram of a scenario of data communication according to some embodiments. As shown in FIG. 7, the communication call page 70*j* displayed by the target terminal 70*c* may include a communication state, for example, being in connection shown in FIG. 7 may indicate that the target user is performing instant voice communication with the user; the communication call page 70*j* may include a communication duration, such as one minute and one second shown in FIG. 7; the communication call page 70*j* may further include a user identifier and a user avatar, such as 187******** and an icon shown in FIG. 7; the communication call page 70*j* may further include a termination control. When completing the communication with the target user, the user can trigger the control to end the communication; and the communication call page 70*j* may further include to-be-confirmed image-text information, such as the prompt information 70*d* shown in FIG. 7, that is, "Whether the following information needs to be confirmed: a user name and a user ID number".

When the target user clicks a confirmation control on the communication call page 70*j*, that is, a "Yes" control 70*e* shown in FIG. 7, the target terminal 70*c* can generate an image-text confirmation request, and the image-text confirmation request carries the to-be-confirmed information. It can be seen that the image-text confirmation request can carry the confirmation information of the certificate number or the confirmation information of the special characters that the user cannot express clearly (i.e., the to-be-confirmed image-text information). By confirming whether the to-be-confirmed information is correct or not, the user can avoid unnecessary mistakes and losses caused by incorrect information transmission. The target terminal 70*c* invokes the communication service plug-in in the server 70*f* according to the image-text confirmation information, and then transmits the image-text confirmation information to the user terminal 70*a* according to the image-text session function provided by the communication service plug-in.

The user terminal 70*a* obtains the image-text confirmation information transmitted by the target terminal 70*c* in the mini program Y through the image-text session function provided by the communication service plug-in, and can display the communication call page 70*b*. As shown in FIG. 7, the communication call page 70*b* can display the to-be-confirmed information in the image-text confirmation request, such as "to-be-verified information: a user name and a user ID number" shown on the communication call page 70*b*. The communication call page 70*b* may further include confirmation controls for the to-be-confirmed information, such as a correct control and a revising control shown in FIG. 7; if the user determines that there is an error in the to-be-confirmed information after verifying the to-be-confirmed information, the user can click the revising control on the communication call page 70*b* to revise the to-be-confirmed information; and if the user determines that the to-be-confirmed information is correct after verifying the to-be-confirmed information, the user can click the correct control on the communication call page 70*b*.

It can be learnt from the above that, in a process of performing instant voice communication with the target user, the user can further perform a confirmation operation on the to-be-confirmed image-text information. After obtaining an image-text confirmation reply message corresponding to the confirmation operation, the user terminal 70*a* can invoke the communication service plug-in in the server 70*f* in the mini program Y, and transmit the image-text confirmation reply message to the target terminal 70*c* according to the image-text session function provided by the communication service plug-in. Referring to FIG. 7 again, after obtaining the image-text confirmation reply message, the target terminal 70*c* can display the communication call page 70*k*. The communication call page 70*k* may include the image-text confirmation information in the image-text confirmation reply message, for example, a confirmation prompt 70*h*, that is, "The following information has been confirmed: the user name and the user ID number". When the target user clicks a save control 70*i* on the communication call page 70*k*, the target terminal 70*c* can save the image-text confirmation information.

The manual customer service is the manual customer service of the mini program Y, and correspondingly, the target terminal 70*c* is the service terminal of the manual customer service of the mini program Y.

It is to be understood that the server 70*f* can save the image-text confirmation request (including to-be-confirmed information) and image-text confirmation reply message (including image-text confirmation information) to generate historical communication record. The function of the historical communication record is described below, which is not repeated herein.

In addition, when the identity of the user needs to be authenticated (such as important operations such as minor recharge consumption, password modification, and money service), it is impossible to fully confirm only through instant voice communication. In this case, both the video call and ID information are required to confirm the identity of the user. In this case, after reaching an agreement with the user through voice communication, the manual customer service can deliver a video session request to the user terminal through the video session function provided by the communication service plug-in. In this case, the user can switch the instant voice call to the instant video call in the embedded subroutine, so as to efficiently and quickly resolve the problem of authenticating the identity of the user.

Operation S13. After the voice call is hung up, the user can receive a satisfaction evaluation message (i.e., the user evaluation request in operation S102). After the user evaluates the satisfaction, the embedded subroutine can deliver an official account message, and the user can receive feedback information about how a follow-up problem is processed by following the official account. In addition, the historical record query function (equivalent to the communication record query function) is opened. The user can trigger a historical communication query control to transmit the historical communication query request to the backend server corresponding to the communication service plug-in, so that the backend server obtains the historical communication record corresponding to the request from the backend server corresponding to the embedded subroutine according to the historical communication query request; and through the communication record query function, it is convenient for the user to find the required communication record again, and it may not be necessary to call the manual customer service again. On the one hand, the pressure of manual customer service is reduced, and on the other hand, service satisfaction is also improved.

It is to be understood that in some embodiments, the historical record query function is equivalent to the information query function, but in actual applications, information provided by the historical record query function and information provided by the information query function may be the same or different, and may be set according to an actual application scenario, which is not limited herein.

In summary, to help the user and the target user (such as manual customer service) to perform multiple information communication more efficiently and quickly, some embodiments proposes a multi-function user service solution based on a mini program plug-in (i.e., a communication service plug-in). In a process of instant voice communication between the user and the target user, the target user can cause the user to perform operations such as online data uploading and online information query by delivering a tool message, and provide an online image-text session function to resolve information that is difficult for the user to express directly in words; and for the work that needs to authenticate the identity of the user, the target user can authenticate the identity of the user by delivering the video session function for the user to quickly switch a voice call to a video call. The multi-function user service solution resolves the problem of multiple information communication between the user and the target user extremely efficiently, quickly, and accurately, which not only improves the service efficiency and satisfaction of the enterprise, but also greatly improves the productivity of the target user.

Figure 8:
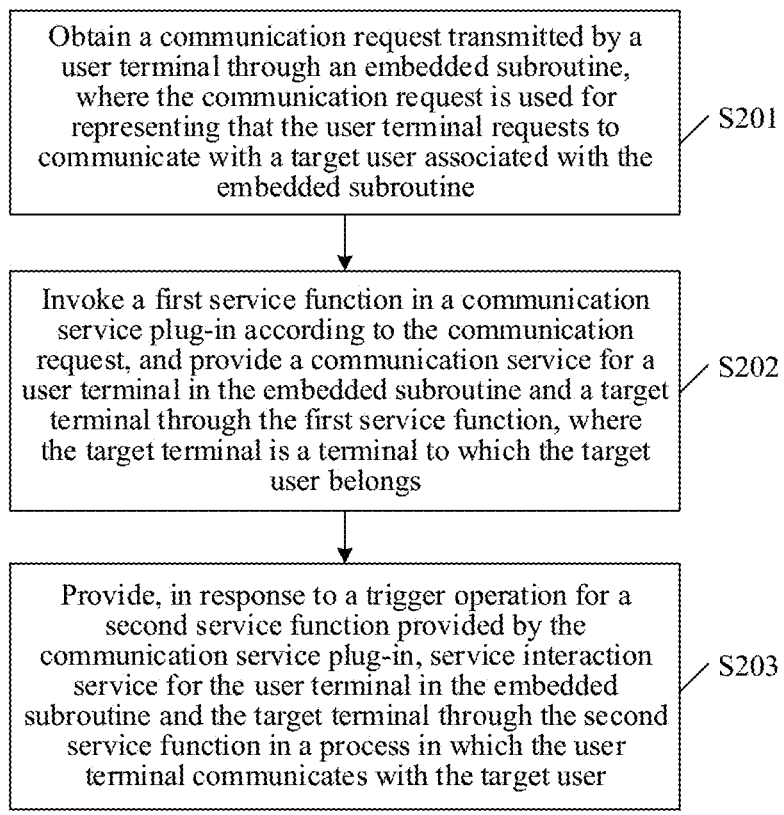
FIG. 8 is a schematic flowchart of a data communication method according to some embodiments.

In some embodiments, FIG. 8 is a schematic flowchart of a data communication method according to some embodiments. The data communication method is performed by a computer device, the computer device may include a backend server, and the backend server includes a communication service plug-in. As shown in FIG. 8, the data communication process may include the following operations.

Operation S201. Obtain a communication request transmitted by a user terminal through an embedded subroutine, where the communication request is used for representing that the user terminal requests to communicate with the target user associated with the embedded subroutine.

The embedded subroutine is developed in the form of a mini program plug-in, and consequently can be easily opened to mini programs of other enterprises for access and use. The other mini programs invoke the embedded subroutine like invoking a component. An application type of the embedded subroutine is not limited herein, which may include a multimedia client (for example, a video client), an entertainment client (for example, a game client), an education client, a livestreaming client, a news client, a shopping client (for example, an e-commerce client), or the like.

Operation S202. Invoke a first service function in the communication service plug-in according to the communication request, and provide a communication service for a user terminal in the embedded subroutine and a target terminal through the first service function, where the target terminal is a terminal to which the target user belongs.

In some embodiments, operation S202 may be implemented in the following manner: obtaining the application identifier of the embedded subroutine carried in the communication request; obtaining the registered application identifiers registered in the communication service plug-in; obtaining configuration information of the embedded subroutine when the application identifier of the embedded subroutine is included in the registered application identifiers; invoking a first service function in the communication service plug-in, and creating a virtual room for the user terminal in the embedded subroutine to communicate with the target terminal through the configuration information and the first service function; and providing a communication service for the user terminal and the target terminal in the virtual room through the first service function when the virtual room is successfully created.

In some embodiments, the creating a virtual room for the user terminal in the embedded subroutine to communicate with the target terminal through the configuration information and the first service function may be implemented in the following manner: invoking a message monitoring component and a message pulling component that are associated with the first service function; instantly monitoring a service state of at least one service terminal associated with the embedded subroutine through the message monitoring component, and periodically pulling the service state of the at least one service terminal through the message pulling component; in response to determining, through the message monitoring component or the message pulling component, that a service terminal whose service state is in an idle state is included in the at least one service terminal, determining the service terminal whose service state is in the idle state as a target terminal; and creating a virtual room for the user terminal in the embedded subroutine to communicate with the target terminal.

In some embodiments, the providing a communication service for the user terminal and the target terminal in the virtual room through the first service function when the virtual room is successfully created may be implemented in the following manner: when the virtual room is successfully created, invoking an audio and video component associated with the first service function, and performing initialized configuration on the audio and video component; transmitting a room identifier to the configured audio and video component when initialized configuration is successfully performed on the audio and video component, where the room identifier is used for representing an identifier of the virtual room; and providing a communication service for the user terminal and the target terminal in the virtual room through the configured audio and video component.

Figure 9:
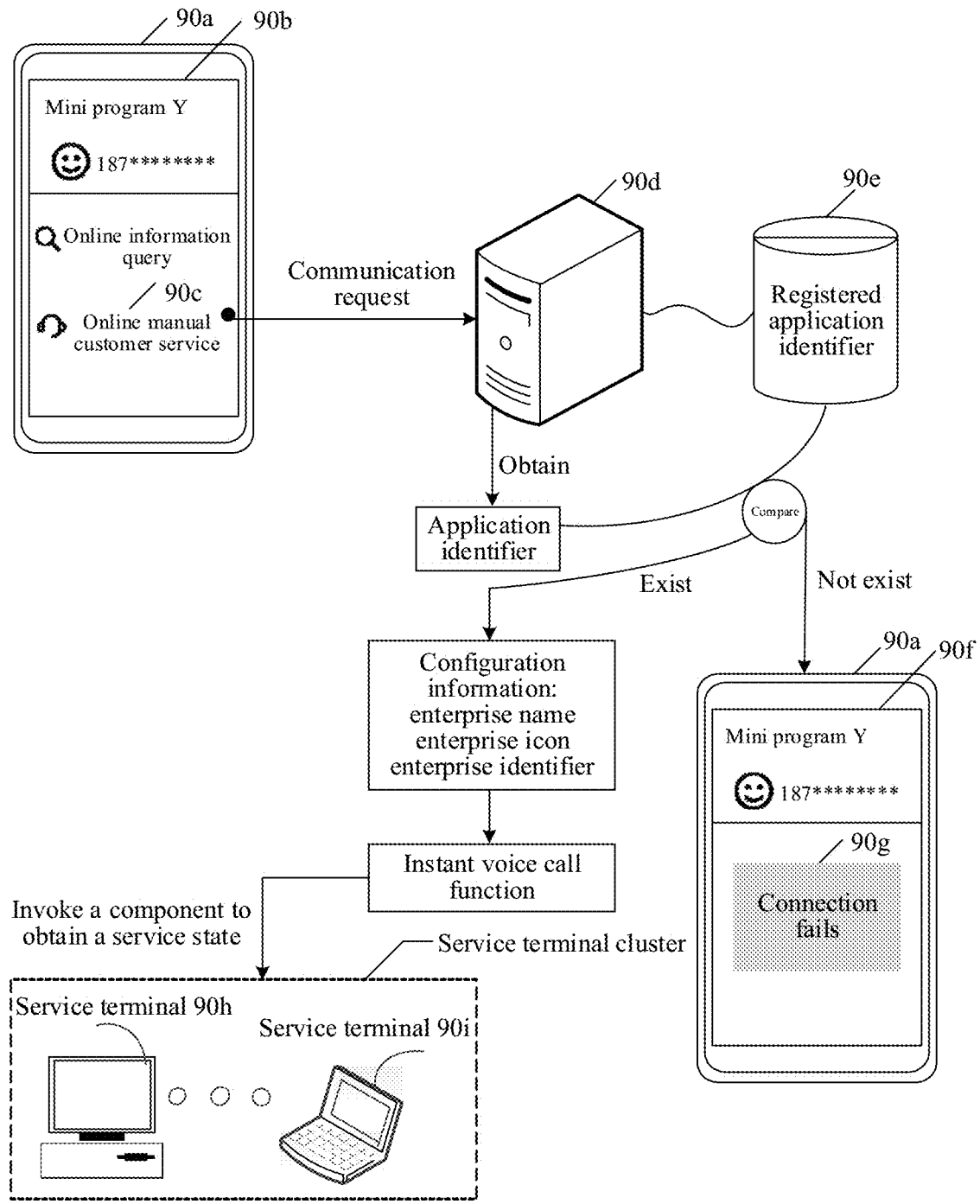
FIG. 9 is a schematic diagram of a scenario of data communication according to some embodiments.

FIG. 9 is a schematic diagram of a scenario of data communication according to some embodiments. As shown in FIG. 9, the user terminal 90*a*, in response to the trigger operation on the communication control (i.e., the online manual customer service control 90*c* shown in FIG. 9) in the mini program Y on the service page 90*b*, generates a communication request, invokes the first service function (i.e., the instant voice call function) in the server 90*d* (i.e., the backend server) according to the communication request, and transmits a communication request to the server 90*d*, where the communication request carries the application identifier of the mini program Y, and the application identifier is unique.

When obtaining the application identifier in the communication request, the server 90*d* obtains the registered application identifiers registered in the communication service plug-in from a database 90*e*. The database 90*e* can be regarded as an electronic file cabinet, which is configured to store electronic files (some embodiments may include the registered application identifiers and the configuration information of the enterprise corresponding to the registered application identifiers). The server 90*d* may perform operations such as adding, querying, updating, and deleting on the registered application identifiers in the database 90*e* and the configuration information of the enterprise corresponding to the registered application identifiers. The so-called "database" is a data set that is stored together in a specific manner, can be shared with a plurality of users, has as little redundancy as possible, and is independent of applications.

Figure 10:
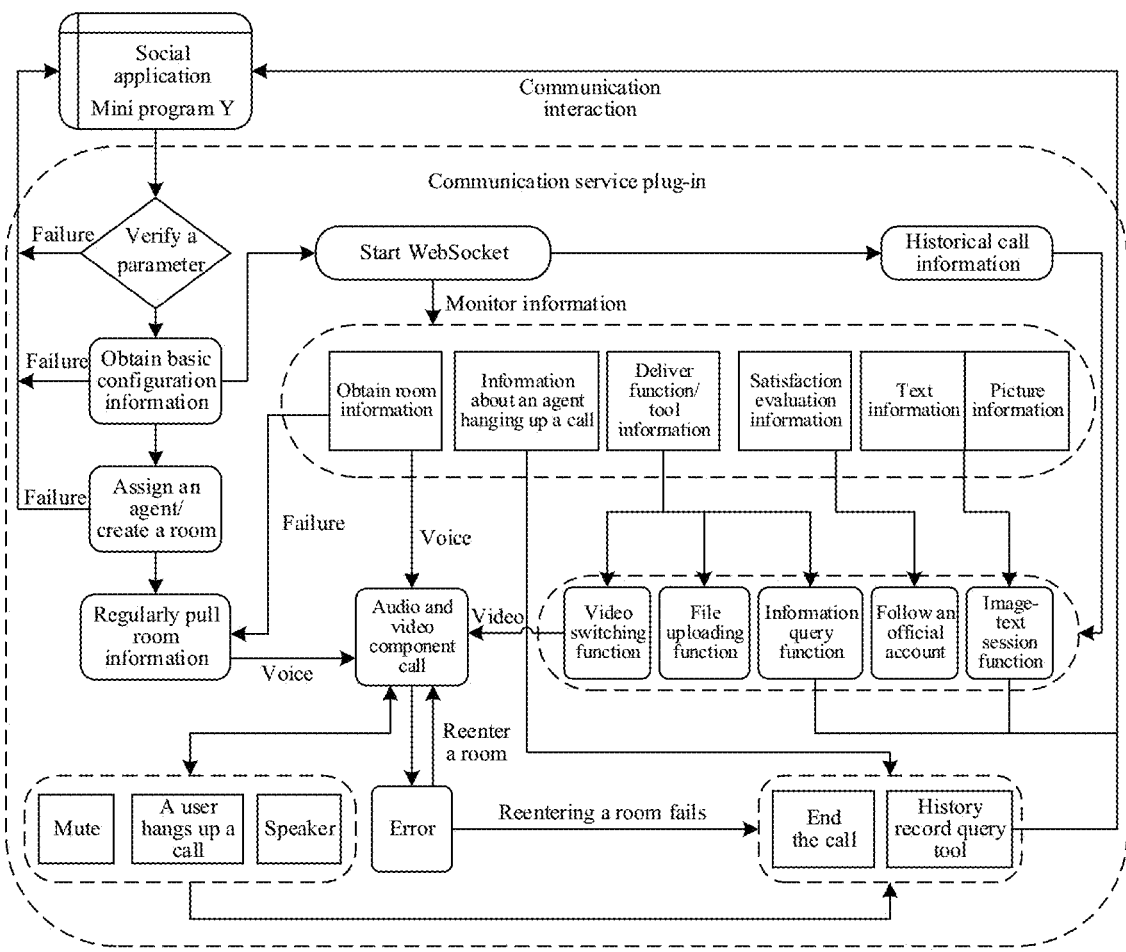
FIG. 10 is a schematic diagram of a system architecture according to some embodiments.

As shown in FIG. 9, if the application identifier of the mini program Y is not included in the registered application identifiers, FIG. 10 is a schematic diagram of a system architecture according to some embodiments. As shown in FIG. 10, the mini program Y is a sub program embedded in a target application (such as a social application). The mini program Y can invoke the communication service plug-in to implement the multi-function communication manner provided by the communication service plug-in. First, the communication service plug-in verifies a parameter, and the parameter may include the application identifier shown in FIG. 9. If the parameter verification fails, that is, the application identifier of the mini programs Y is not included in the registered application identifiers, the communication service plug-in can determine that the enterprise corresponding to the mini program Y is not registered with the communication service plug-in in the server 90d, or is not successfully registered. As shown in FIG. 9, in this case, the user terminal 90a may display prompt information 90g, such as connection failure, to prompt the user that the instant voice communication cannot be performed with the enterprise of the mini program Y through the online manual customer service.

If the parameter verification succeeds, that is, the application identifier of the mini program Y is included in the registered application identifiers, the communication service plug-in (equivalent to the server 90d) obtains the configuration information of the mini program Y. The basic configuration information may include an enterprise name, an enterprise icon, and an enterprise identifier (the enterprise identifier is not equivalent to the application identifier, the application identifier is an identifier generated by the server 90d for the enterprise corresponding to the mini program Y when the enterprise corresponding to the mini program Y registers invoking authority for the communication service plug-in in the server 90d, and the enterprise identifier may include information such as an enterprise communication manner and an enterprise legal person, or the like). In actual applications, the basic configuration information can be set according to an actual condition, which is not limited herein. As shown in FIG. 10, if the communication service plug-in does not obtain the configuration information, the communication service plug-in returns a failure prompt message to the mini program Y in the user terminal 90a to prompt the user that the manual customer service of the mini program Y cannot be connected.

Figure 11:
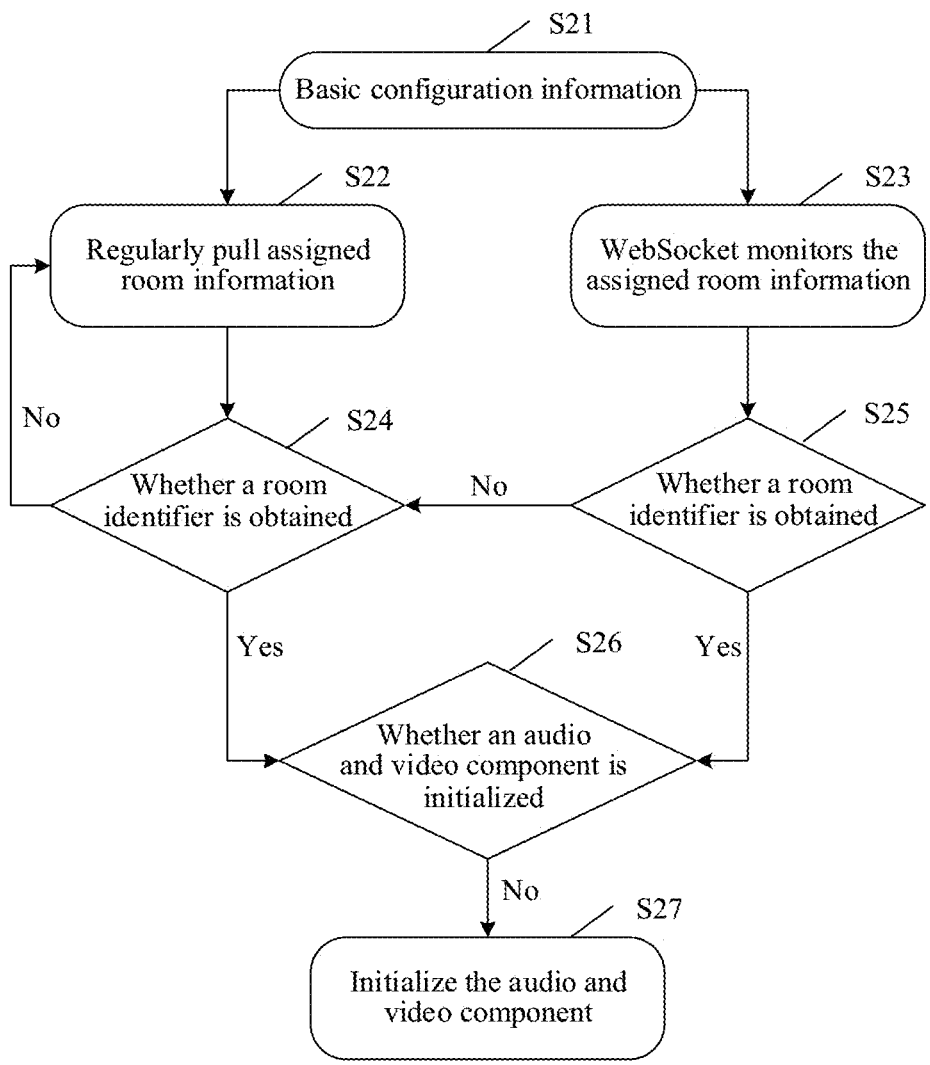
FIG. 11 is a schematic flowchart of data communication processing according to some embodiments.

As shown in FIG. 9, after successfully obtaining the basic configuration information of the mini program Y, the communication service plug-in activates the instant voice call function for the user terminal 90a, and invokes the message monitoring component and the message pulling component that are associated with the instant voice call function; and referring to FIG. 9 and FIG. 10, the communication service plug-in instantly monitors a service state of each service terminal in the service terminal cluster of the mini program Y through the message monitoring component (i.e., WebSocket). The service terminal cluster may include one or more, which is not limited herein. As shown in FIG. 9, the service terminal cluster may include a service terminal 90h, . . . , and a service terminal 90i. In addition, the communication service plug-in periodically pulls the service state of each service terminal in the service terminal cluster through the message pulling component. FIG. 11 is a schematic flowchart of data communication processing according to some embodiments. As shown in FIG. 11, an overall flow of the data communication method may include operation S21 to operation S27.

Operation S21 to Operation S25. After obtaining the basic configuration information, the communication service plug-in opens WebSocket to instantly monitor the service state of each service terminal in the service terminal cluster, that is, performs a task of instantly pulling room information. If the WebSocket fails to monitor the room information, the WebSocket continues to transmit requests through the regular pulling task until the room information of the assigned manual customer service is successfully obtained.

Operation S26 to Operation S27. The communication service plug-in provides two manners to obtain the room information. Provided that the room information for the manual customer service is obtained, a TRTC component is initialized. After the TRTC component is successfully initialized, the communication service plug-in transmits the room information to a TRTC audio and video component. In this case, the user and the target user can implement audio and video services and other service services.

As shown in FIG. 10, there are six types of messages monitored by the WebSocket defined by the communication service plug-in. The delivered message includes a video switching function, a file uploading function, and an information query function. The user can perform operations according to service requirements without performing additional processing on other platforms. In addition, the user can further perform image-text communication with the customer service through the image-text session function, so as to resolve the information that is difficult to express with voice in the communication between the user and the agent.

Operation S203. In response to a trigger operation for a second service function provided by a communication service plug-in, provide the user terminal in the embedded subroutine and the target terminal with a service interaction service through the second service function in a process in which the user terminal communicates with the target user.

In some embodiments, the second service function includes a file uploading function, and the operation S203 may be implemented in the following manner: respectively obtaining a communication message of the user terminal and a communication message of the target terminal in the process in which the user terminal communicates with the target user, where the communication message includes a file uploading request and target file; obtaining the file uploading request transmitted by the target terminal on the communication call page through the file uploading function provided by the communication service plug-in; synchronizing the file uploading request to the user terminal, so that the user terminal, in response to the trigger operation for the file uploading request, performs the file uploading operation in a process of communicating with the target user, and obtains the target file corresponding to the file uploading operation; obtaining the target file transmitted by the user terminal in the embedded subroutine on the communication call page; and synchronizing the target file to the target terminal through the file uploading function.

In some embodiments, the second service function includes an image-text session function, and the operation S203 may be implemented in the following manner: respectively obtaining a communication message of the user terminal and a communication message of the target terminal in the process in which the user terminal communicates with the target user, where the communication message includes the image-text confirmation request and the image-text confirmation reply message; obtaining the image-text confirmation request transmitted by the target terminal on the communication call page through the image-text session function provided by the communication service plug-in; the image-text confirmation request carries to-be-confirmed image-text information; and synchronizing the image-text confirmation request to the user terminal, so that the user terminal, in response to the trigger operation for the image-text confirmation request, performs the confirmation operation for the to-be-confirmed image-text information in the process of communicating with the target user, and obtains the image-text confirmation reply message corresponding to the confirmation operation; obtaining the image-text confirmation reply message transmitted by the user terminal in the embedded subroutine on the communication call page; and synchronizing the image-text confirmation reply message to the target terminal through the image-text session function.

In some embodiments, the second service function includes a video session function, and the operation S203 may be implemented in the following manner: respectively obtaining a communication message of the user terminal and a communication message of the target terminal in the process in which the user terminal communicates with the target user, where the communication message includes a video session request; obtaining the video session request transmitted by the target terminal on the communication call page through the video session function provided by the communication service plug-in; and synchronizing the video session request to the user terminal, so that the user terminal, in response to the trigger operation for the video session request, switches the communication manner on the communication call page to the video communication manner in the embedded subroutine, and performs video communication with the target user in the video communication manner.

In some embodiments, a communication state of the user terminal and a communication state of the target terminal are respectively obtained in a process in which the user terminal performs service interaction with the target user; when the communication state of the user terminal is a communication termination state, and the communication state of the target terminal is a communication call state, a first communication termination message is generated according to the communication termination state, and the first communication termination message is transmitted to the target terminal, so that the target terminal performs a communication termination operation according to the first communication termination message; and when the communication state of the target terminal is a communication termination state, and the communication state of the user terminal is a communication call state, a second communication termination message is generated according to the communication termination state, and the second communication termination message is transmitted to the user terminal, so that the user terminal performs a communication termination operation according to the second communication termination message.

In some embodiments, a historical communication query request transmitted by a user terminal through an embedded subroutine is obtained; the historical communication query request is generated by the user terminal in response to the trigger operation for the historical communication query control in the embedded subroutine; the historical communication query request is used for requesting to query the historical communication record between historical users associated with the embedded subroutine, where the historical users include the target user; the communication record query function in the communication service plug-in is invoked according to the historical communication query request; and the historical communication record requested by the historical communication query request is transmitted to the user terminal in the embedded subroutine through the communication record query function.

Figure 12:
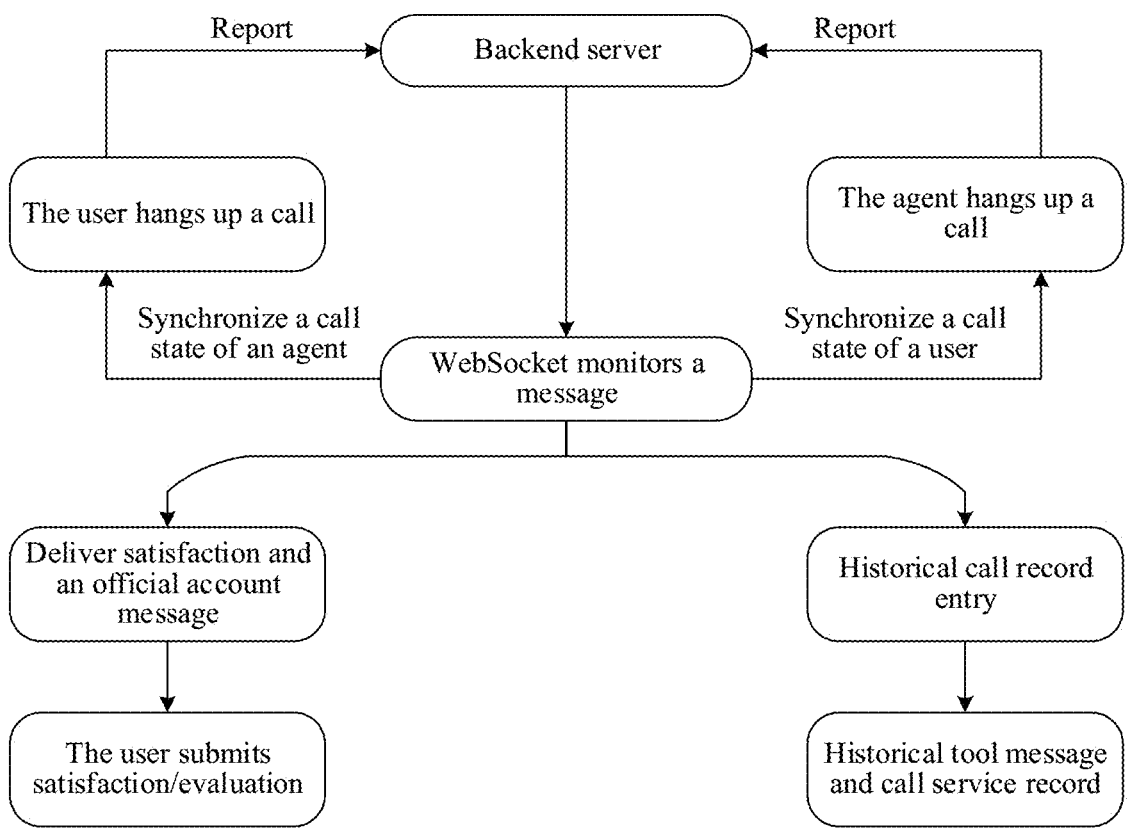
FIG. 12 is a schematic diagram of a network architecture according to some embodiments.

FIG. 12 is a schematic diagram of a network architecture according to some embodiments. As shown in FIG. 12, in a process in which the user terminal communicates with the target user (i.e., the agent), the communication service plug-in respectively monitors the communication message and the communication state of the user terminal and the communication message and the communication state of the target terminal through the WebSocket; and if the user hangs up the communication, when obtaining that the communication state of the user terminal is a communication termination state, and when the communication state of the target terminal is a communication call state, the communication service plug-in may generate the first communication termination message according to the communication termination state of the user terminal, and then report the first communication termination message to the backend server. When receiving the first communication termination message, the backend server determines that the communication state of the user terminal is the communication termination state, and in this case, returns the first communication termination message to the WebSocket, thereby prompting the agent side that the user disconnects the communication. Similarly, if the target user hangs up the communication, when obtaining that the communication state of the user terminal is a communication call state, and when the communication state of the target terminal is a communication termination state, the communication service plug-in may generate the second communication termination message according to the communication termination state of the target terminal, and then report the second communication termination message to the backend server. When receiving the second communication termination message, the backend server determines that the communication state of the target terminal is the communication termination state, and in this case, returns the second communication termination message to the WebSocket, thereby prompting the user side that the target user disconnects the communication.

Referring to FIG. 10 and FIG. 12, after the communication ends, if the communication service plug-in verifies that the backend server is configured with the satisfaction and an official account, the communication service plug-in delivers the two messages to the communication termination page of the user terminal for a further operation by the user, and simultaneously opens a historical call record entry, so that the user can view related service information subsequently.

Figure 13:
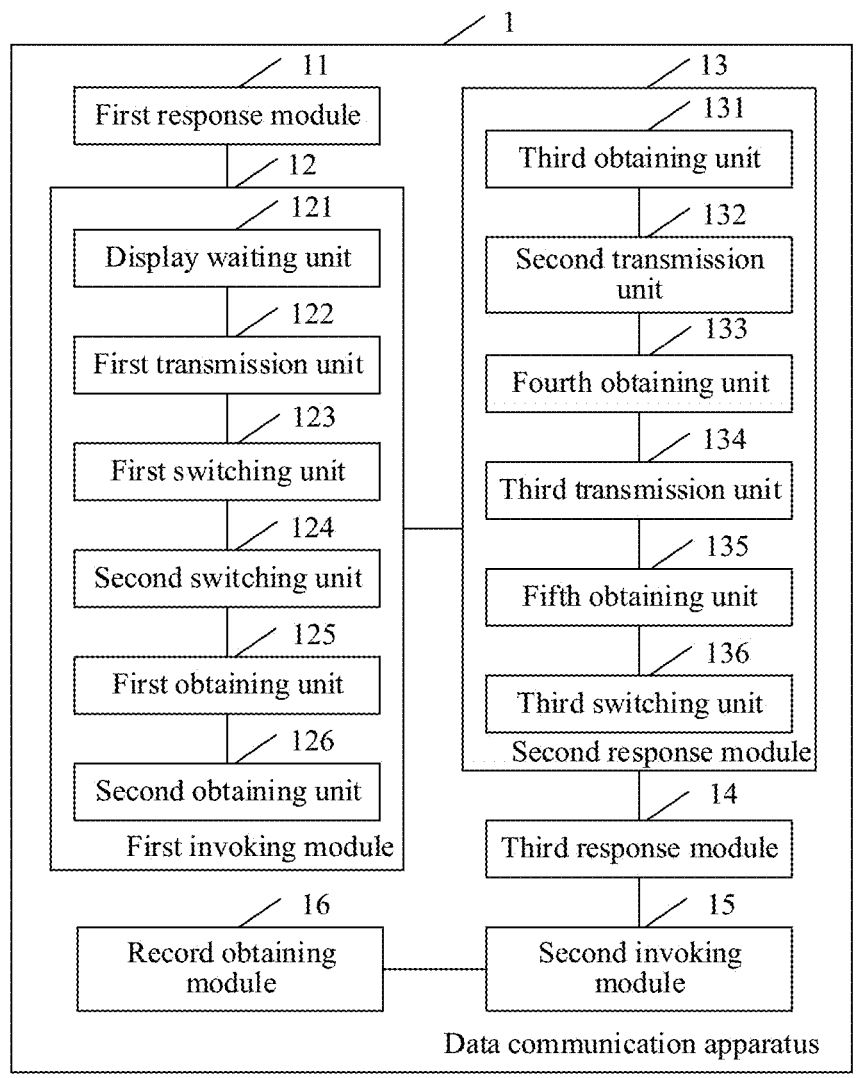
FIG. 13 is a schematic structural diagram of a data communication apparatus according to some embodiments.

In some embodiments, FIG. 13 is a schematic structural diagram of a data communication apparatus according to some embodiments. The data communication apparatus may be a computer program (including program code) run in a computer device. For example, the data communication apparatus is an application software; and the apparatus may be configured to perform the data communication method provided in some embodiments. As shown in FIG. 13, the data communication apparatus 1 may include: a first response module 11, a first invoking module 12, and a second response module 13.

The first response module 11 is configured to generate a communication request in response to a trigger operation for a communication control in an embedded subroutine, where the communication request is used for requesting to communicate with the target user associated with the embedded subroutine;

a first invoking module 12 is configured to invoke the communication service plug-in according to the communication request, and communicate with the target user in the embedded subroutine through the first service function provided by the communication service plug-in; and a second response module 13 is configured to perform, in response to a trigger operation for a second service function provided by a communication service plug-in, service interaction with the target user in the embedded subroutine through the second service function in a process of communicating with the target user.

In some embodiments, for a specific implementation of functions of the first response module 11, the first invoking module 12, and the second response module 13, reference may be made to operation S101 to operation S103 in the embodiment corresponding to FIG. 4, and details are not described herein again.

In some embodiments, the first invoking module 12 may include: a display waiting unit 121, a first transmission unit 122, and a first switching unit 123.

The display waiting unit 121 is configured to display a communication waiting page in the embedded subroutine through the first service function provided by the communication service plug-in, where the communication waiting page includes a cancel control;

the first transmission unit 122 is configured to, in response to the trigger operation for the cancel control on the communication waiting page, cancel a display of the communication waiting page, and transmit a communication termination request to the backend server corresponding to the communication service plug-in, so that the backend server cancels the communication request according to the communication termination request; and the first switching unit 123 is configured to, in response to the confirmation operation of the target user assigned by the communication service plug-in on the communication waiting page, switch the communication waiting page to the communication call page in the embedded subroutine, and communicate with the target user on the communication call page.

In some embodiments, for a specific implementation of functions of the display waiting unit 121, the first transmission unit 122, and the first switching unit 123, reference may be made to operation S102 in the embodiment corresponding to FIG. 4, and details are not described herein again.

In some embodiments, the first invoking module 12 may include: a second switching unit 124, a first obtaining unit 125, and a second obtaining unit 126.

The second switching unit 124 is configured to switch the communication call page to the communication termination page in the embedded subroutine in response to the trigger operation for the termination control on the communication call page;

the first obtaining unit 125 is configured to obtain the user evaluation request transmitted by the target terminal through the user evaluation function provided by the communication service plug-in on the communication termination page; and the second obtaining unit 126 is configured to, in response to a trigger operation for the user evaluation request, perform an evaluation operation for the target user, obtain user evaluation information corresponding to the evaluation operation, and transmit the user evaluation information to the target terminal through the user evaluation function.

In some embodiments, for a specific implementation of functions of the second switching unit 124, the first obtaining unit 125, and the second obtaining unit 126, reference may be made to operation S102 in the embodiment corresponding to FIG. 4, and details are not described herein again.

In some embodiments, the second service function includes a file uploading function; and the second response module may include: a third obtaining unit 131 and a second transmission unit 132.

The third obtaining unit 131 is configured to obtain the file uploading request transmitted by the target terminal in the embedded subroutine through the file uploading function provided by the communication service plug-in on the communication call page; and the second transmission unit 132 is configured to, in response to the trigger operation for the file uploading request, perform the file uploading operation in a process of communicating with the target user, obtain the target file corresponding to the file uploading operation, and transmit the target file to the target terminal through the file uploading function in the embedded subroutine.

In some embodiments, for a specific implementation of functions of the third obtaining unit 131 and the second transmission unit 132, reference may be made to operation S103 in the embodiment corresponding to FIG. 4, and details are not described herein again.

In some embodiments, the second service function includes an image-text session function; and the second response module 13 may include: a fourth obtaining unit 133 and a third transmission unit 134.

The fourth obtaining unit 133 is configured to obtain the image-text confirmation request transmitted by the target terminal in the embedded subroutine through the image-text session function provided by the communication service plug-in on the communication call page, where the image-text confirmation request carries the to-be-confirmed image-text information; and the third transmission unit 134 is configured to, in response to the trigger operation for the image-text confirmation request, perform a confirmation operation for the to-be-confirmed image-text information, obtain an image-text confirmation reply message corresponding to the confirmation operation, and transmit the image-text confirmation reply message to the target terminal through the image-text session function in the embedded subroutine in the process of communicating with the target user.

In some embodiments, for a specific implementation of functions of the fourth obtaining unit 133 and the third transmission unit 134, reference may be made to operation S103 in the embodiment corresponding to FIG. 4, and details are not described herein again.

In some embodiments, the second service function includes a video session function; and the second response module 13 may include: a fifth obtaining unit 135 and a third switching unit 136.

The fifth obtaining unit 135 is configured to obtain the video session request transmitted by the target terminal in the embedded subroutine through the video session function provided by the communication service plug-in on the communication call page; and the third switching unit 136 is configured to, in response to the trigger operation for the video session request, switch the communication manner on the communication call page to the video communication manner in the embedded subroutine, and perform video communication with the target user in the video communication manner.

In some embodiments, for a specific implementation of functions of the fifth obtaining unit 135 and the third switching unit 136, reference may be made to operation S103 in the embodiment corresponding to FIG. 4, and details are not described herein again.

In some embodiments, the data communication apparatus 1 may further include: a third response module 14, a second invoking module 15, and a record obtaining module 16.

The third response module 14 is configured to generate a historical communication query request in response to a trigger operation for a historical communication query control in an embedded subroutine, where the historical communication query request is used for requesting to query the historical communication record between historical users associated with the embedded subroutine, where the historical users include the target user;

the second invoking module 15 is configured to invoke the communication service plug-in according to the historical communication query request, and transmit the historical communication query request to the backend server corresponding to the communication service plug-in through the communication record query function provided by the communication service plug-in; and the record obtaining module 16 is configured to obtain the historical communication record requested by the historical communication query request in the embedded subroutine through the communication record query function.

In some embodiments, for a specific implementation of functions of the third response module 14, the second invoking module 15, and the record obtaining module 16, reference may be made to operation S103 in the embodiment corresponding to FIG. 4, and details are not described herein again.

Figure 14:
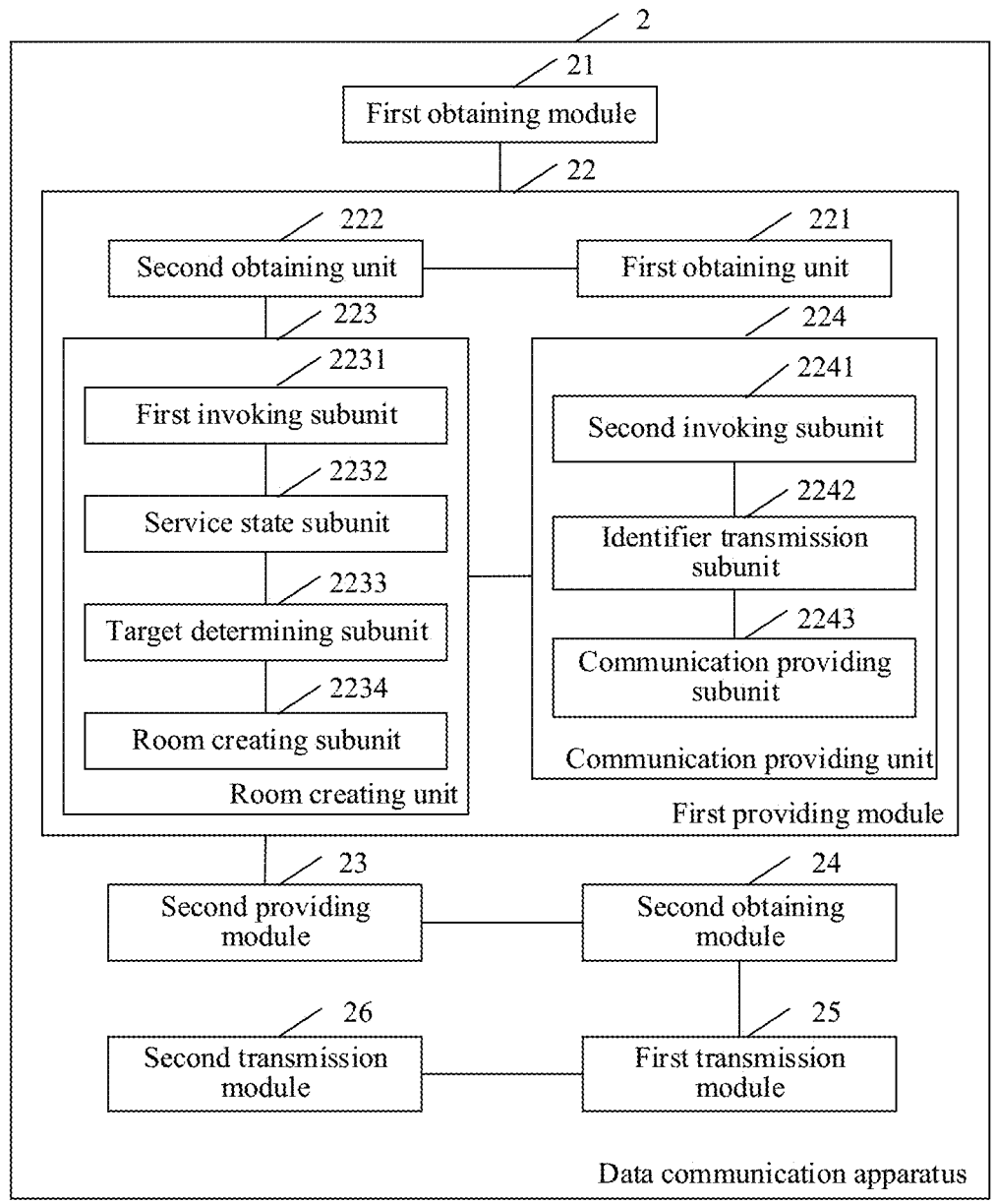
FIG. 14 is a schematic structural diagram of a data communication apparatus according to some embodiments.

In some embodiments, FIG. 14 is a schematic structural diagram of a data communication apparatus according to some embodiments. The apparatus is run on a backend server, and the backend server includes a communication service plug-in. The data communication apparatus may be a computer program (including program code) run in a computer device. For example, the data communication apparatus is an application software; and the apparatus may be configured to perform the data communication method provided in some embodiments. As shown in FIG. 14, the data communication apparatus 2 may include: a first obtaining module 21, a first providing module 22, and a second providing module 23.

The first obtaining module 21 is configured to obtain a communication request transmitted by a user terminal through an embedded subroutine, where the communication request being used for representing that the user terminal requests to communicate with a target user associated with the embedded subroutine;

the first providing module 22 is configured to invoke a first service function in the communication service plug-in according to the communication request, and provide a communication service for a user terminal in the embedded subroutine and a target terminal through the first service function, where the target terminal is a terminal to which the target user belongs; and the second providing module 23 is configured to provide, in response to a trigger operation for a second service function provided by a communication service plug-in, the user terminal in the embedded subroutine and the target terminal with a service interaction service through the second service function in a process in which the user terminal communicates with the target user.

For a specific implementation of functions of the first obtaining module 21, the first providing module 22, and the second providing module 23, reference may be made to operation S201 to operation S203 in the embodiment corresponding to FIG. 8, and details are not described herein again.

In some embodiments, the first providing module 22 may include: a first obtaining unit 221, a second obtaining unit 222, a room creating unit 223, and a communication providing unit 224.

The first obtaining unit 221 is configured to obtain the application identifier of the embedded subroutine carried in the communication request;

the first obtaining unit 221 is further configured to obtain the registered application identifiers registered in the communication service plug-in;

the second obtaining unit 222 is further configured to obtain configuration information of the embedded subroutine when the application identifier of the embedded subroutine is included in the registered application identifiers;

the room creating unit 223 is configured to invoke a first service function in the communication service plug-in, and create a virtual room for the user terminal in the embedded subroutine to communicate with the target terminal through the configuration information and the first service function; and the communication providing unit 224 is configured to provide a communication service for the user terminal and the target terminal in the virtual room through the first service function when the virtual room is successfully created.

In some embodiments, for a specific implementation of functions of the first obtaining unit 221, the second obtaining unit 222, the room creating unit 223, and the communication providing unit 224, reference may be made to operation S202 in the embodiment corresponding to FIG. 8, and details are not described herein again.

In some embodiments, the room creating unit 223 may include: a first invoking subunit 2231, a service state subunit 2232, a target determining subunit 2233, and a room creating subunit 2234.

The first invoking subunit 2231 is configured to invoke the message monitoring component and the message pulling component that are associated with the first service function;

the service state subunit 2232 is configured to instantly monitor a service state of at least one service terminal associated with the embedded subroutine through the message monitoring component, and periodically pull the service state of the at least one service terminal through the message pulling component;

the target determining subunit 2233 is configured to, in response to determine, through the message monitoring component or the message pulling component, that a service terminal whose service state is in an idle state is included in the at least one service terminal, determine the service terminal whose service state is in the idle state as a target terminal; and the room creating subunit 2234 is configured to create a virtual room for the user terminal in the embedded subroutine to communicate with the target terminal.

In some embodiments, for a specific implementation of functions of the first invoking subunit 2231, the service state subunit 2232, the target determining subunit 2233, and the room creating subunit 2234, reference may be made to operation S202 in the embodiment corresponding to FIG. 8, and details are not described herein again.

In some embodiments, the communication providing unit 224 may include: a second invoking subunit 2241, an identifier transmission subunit 2242, and a communication providing subunit 2243.

The second invoking subunit 2241 is configured to, when the virtual room is successfully created, invoke an audio and video component associated with the first service function, and perform initialized configuration on the audio and video component;

the identifier transmission subunit 2242 is configured to transmit a room identifier to the configured audio and video component when initialized configuration is successfully performed on the audio and video component, where the room identifier is used for representing an identifier of the virtual room; and the communication providing subunit 2243 is configured to provide a communication service for the user terminal and the target terminal in the virtual room through the configured audio and video component.

In some embodiments, for a specific implementation of functions of the second invoking subunit 2241, the identifier transmission subunit 2242, and the communication providing subunit 2243, reference may be made to operation S202 in the embodiment corresponding to FIG. 8, and details are not described herein again.

In some embodiments, the data communication apparatus 2 may further include: a second obtaining module 24, a first transmission module 25, and a second transmission module 26.

The second obtaining module 24 is configured to respectively obtain a communication state of the user terminal and a communication state of the target terminal in a process in which the user terminal performs service interaction with the target user;

the first transmission module 25 is configured to, when the communication state of the user terminal is a communication termination state, and the communication state of the target terminal is a communication call state, generate a first communication termination message according to the communication termination state, and transmit the first communication termination message to the target terminal, so that the target terminal performs a communication termination operation according to the first communication termination message; and the second transmission module 26 is configured to, when the communication state of the target terminal is a communication termination state, and the communication state of the user terminal is a communication call state, generate a second communication termination message according to the communication termination state, and transmit the second communication termination message to the user terminal, so that the user terminal performs a communication termination operation according to the second communication termination message.

In some embodiments, for a specific implementation of functions of the second obtaining module 24, the first transmission module 25, and the second transmission module 26, reference may be made to operation S203 in the embodiment corresponding to FIG. 8, and details are not described herein again.

Figure 15:
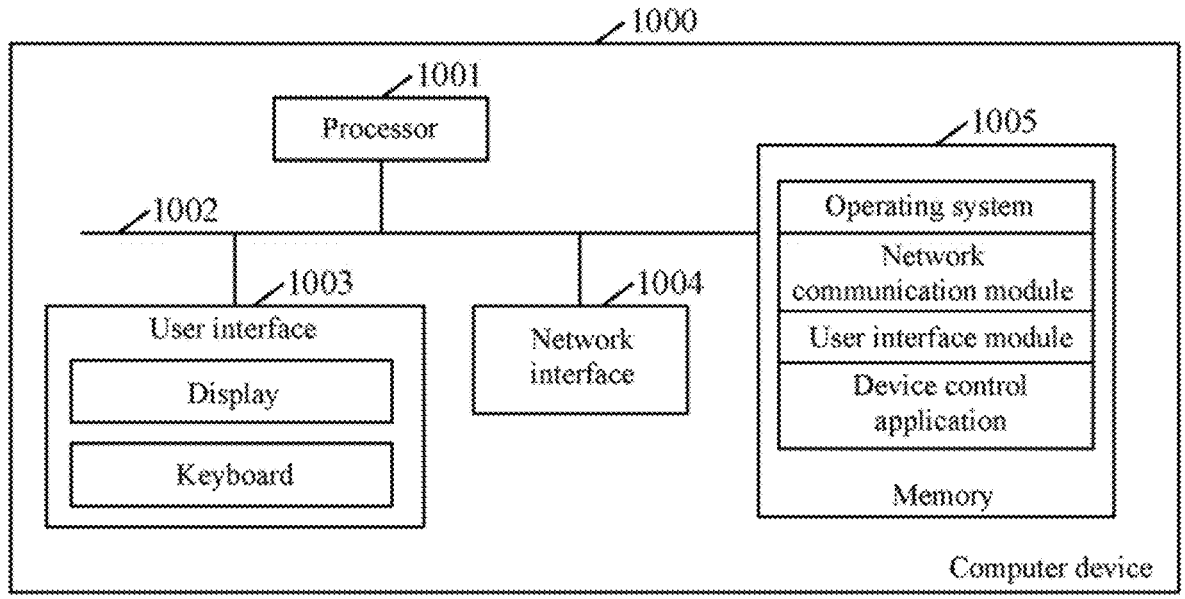
FIG. 15 is a schematic structural diagram of a computer device according to some embodiments.

In some embodiments, FIG. 15 is a schematic structural diagram of a computer device according to some embodiments. As shown in FIG. 15, the computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between the components. The user interface 1003 may include a display and a keyboard. Optionally, the user interface 1003 may further include a standard wired interface and a wireless interface. Optionally, the network interface 1004 may include a standard wired interface and a standard wireless interface (such as a Wi-Fi interface). The memory 1005 may be a high-speed RAM, or may be a non-volatile memory, for example, at least one magnetic disk memory. Optionally, the memory 1005 may be at least one storage apparatus that is located far away from the foregoing processor 1001. As shown in FIG. 15, the memory 1005 used as a computer-readable storage medium may include an operating system, a network communication module, a user interface module, and a device-control application program.

In the computer device 1000 shown in FIG. 15, the network interface 1004 may provide a network communication function; the user interface 1003 is mainly configured to provide an input interface for the user; and the processor 1001 may be configured to invoke a device control application stored in the memory 1005, to implement the following operations:

generating a communication request in response to a trigger operation for a communication control in an embedded subroutine, the communication request being used for requesting to communicate with the target user associated with the embedded subroutine;

invoking a communication service plug-in according to the communication request, and communicating with the target user in the embedded subroutine through a first service function provided by the communication service plug-in; and performing, in response to a trigger operation for a second service function provided by the communication service plug-in, service interaction with the target user in the embedded subroutine through the second service function in a process of communicating with the target user.

It is to be understood that, the computer device 1000 described in some embodiments may implement the descriptions of the data communication method in the embodiments corresponding to FIG. 4 and FIG. 8, or may also implement the descriptions of the data communication apparatus 1 in the embodiment corresponding to FIG. 13. Details are not described herein again. In addition, the description of beneficial effects of the same method is not described herein again.

Figure 16:
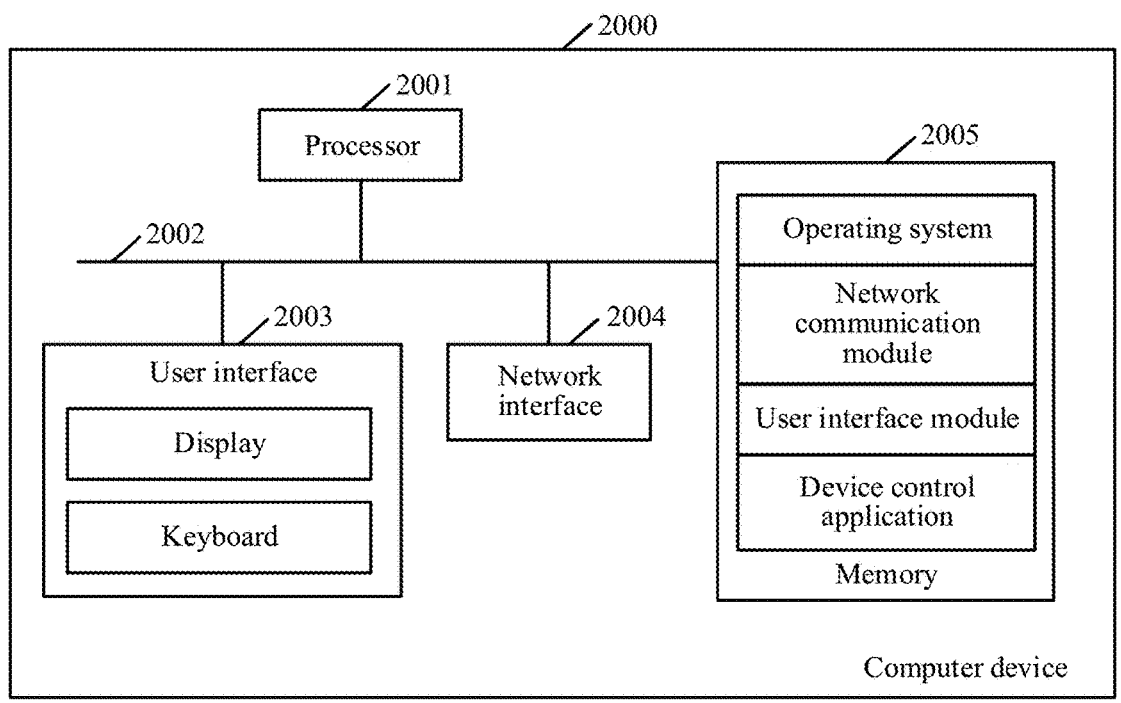
FIG. 16 is a schematic structural diagram of a computer device according to some embodiments.

In some embodiments, FIG. 16 is a schematic structural diagram of a computer device according to some embodiments. The computer device includes a communication service plug-in. As shown in FIG. 16, the computer device 2000 may include: a processor 2001, a network interface 2004, and a memory 2005. In addition, the computer device 2000 may further include: a user interface 2003 and at least one communication bus 2002. The communication bus 2002 is configured to implement connection and communication between the components. The user interface 2003 may include a display and a keyboard. Optionally, the user interface 2003 may further include a standard wired interface and a wireless interface. Optionally, the network interface 2004 may include a standard wired interface and a standard wireless interface (such as a Wi-Fi interface). The memory 2005 may be a high-speed RAM, or may be a non-volatile memory, for example, at least one magnetic disk memory. Optionally, the memory 2005 may be at least one storage apparatus that is located far away from the foregoing processor 2001. As shown in FIG. 16, the memory 2005 used as a computer-readable storage medium may include an operating system, a network communication module, a user interface module, and a device-control application program.

In the computer device 2000 shown in FIG. 16, the network interface 2004 may provide a network communication function; the user interface 2003 is mainly configured to provide an input interface for the user; and the processor 2001 may be configured to invoke a device control application stored in the memory 2005, to implement the following operations: obtaining a communication request transmitted by a user terminal through an embedded subroutine, where the communication request is used for representing that the user terminal requests to communicate with the target user associated with the embedded subroutine; invoking a first service function in the communication service plug-in according to the communication request, and providing communication service for a user terminal in the embedded subroutine and a target terminal through the first service function, where the target terminal is a terminal to which the target user belongs; and providing, in response to a trigger operation for a second service function provided by the communication service plug-in, service interaction service for the user terminal in the embedded subroutine and the target terminal through the second service function in a process in which the user terminal communicates with the target user.

It is to be understood that, the computer device 2000 described in some embodiments may implement the descriptions of the data communication method in the embodiments corresponding to FIG. 4 and FIG. 8, or may also implement the descriptions of the data communication apparatus 2 in the embodiment corresponding to FIG. 14. Details are not described herein again. In addition, the description of beneficial effects of the same method is not described herein again.

Some embodiments further provide a non-transitory computer-readable storage medium, storing a computer program, the computer program including program instructions, the program instructions, when executed by a processor, implementing the data communication method provided by various operations in FIG. 4 and FIG. 8. For details, reference may be made to the implementations provided by the various operations in FIG. 4 and FIG. 8. Details are not described herein again.

The computer-readable storage medium may be the data communication apparatus provided in any of the foregoing embodiments or an internal storage unit of the computer device, for example, a hard disk or an internal memory of the computer device. The computer-readable storage medium may also be an external storage device of the computer device, such as a plug-in hard disk, a smart media card (SMC), a secure digital (SD) card, or a flash card that is equipped on the computer device. In some embodiments, the computer-readable storage medium may also include an internal storage unit of the computer device and an external storage device. The computer-readable storage medium is configured to store the computer program and another program and data that are required by the computer device. The computer-readable storage medium may be further configured to temporarily store data that has been outputted or data to be outputted.

In some embodiments, claims, and accompanying drawings of the disclosure, the terms "first" and "second" are intended to distinguish between different objects but do not indicate a particular order. In addition, the term "include" and any variant thereof are intended to cover a non-exclusive inclusion. For example, a process, method, apparatus, product, or device that includes a series of steps/operations or modules is not limited to the listed operations or modules; and instead, further optionally includes a step/operation or module that is not listed, or further optionally includes another operation or unit that is intrinsic to the process, method, apparatus, product, or device.

The units, modules, and algorithm operations in the examples described with reference to the embodiments disclosed herein may be implemented by electronic hardware (e.g., processing circuitry), computer software (e.g., a computer programming language), or a combination thereof. To clearly describe the interchangeability between the hardware and the software, the foregoing has generally described compositions and operations of each example according to functions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the embodiments.

The methods and related apparatuses provided by some embodiments are described with reference to the method flowcharts and/or schematic structural diagrams provided in some embodiments. Specifically, each process of the method flowcharts and/or each block of the schematic structural diagrams, and a combination of processes in the flowcharts and/or blocks in the block diagrams can be implemented by computer program instructions. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the schematic structural diagrams. These computer program instructions may also be stored in a computer-readable memory that can guide a computer or another programmable data processing device to work in a specified manner, so that the instructions stored in the computer-readable memory generate a product including an instruction apparatus, where the instruction apparatus implements functions specified in one or more processes in the flowcharts and/or one or more blocks in the schematic structural diagrams. The computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the schematic structural diagrams.

In summary, in some embodiments, when the user needs to communicate with the target user (such as enterprise customer service), the user can first start the embedded subroutine corresponding to the target user in the target application of the corresponding user terminal, and then trigger the communication control in the embedded subroutine. Then the user terminal can generate a communication request based on the trigger operation, and the communication request is generated in the embedded subroutine and does not jump to other communication applications of the user terminal; the user terminal invokes the communication service plug-in according to the communication request, and causes the user to communicate with the target user through the embedded subroutine through the first service function provided by the communication service plug-in. Because the user performs voice communication with the target user (such as enterprise customer service) in the embedded subroutine, and the communication manner is not transmitted through the traditional telephone network of the telecommunication operator, but through the internet, the communication cost of the user can be reduced; and in addition, in a process of performing voice communication with the target user, the user can further perform other service interactions with the target user in the embedded subroutine through the second service function provided by the communication service plug-in, so that the two users can efficiently implement service interaction in the communication process. That is, communication does not need to be interrupted while implementing other service interactions, which can not only effectively reduce the communication cost of the user, but also improve the communication efficiency between the user and the target user.

The foregoing descriptions are merely embodiments of the disclosure and are not intended to limit the protection scope. Any modification, equivalent replacement, or improvement made without departing from the spirit and range of the disclosure shall fall within the protection scope of the disclosure.

What is claimed is:

1. A data communication method, performed by a computer device, the method comprising:
   generating a communication request in response to a first trigger operation in a mini program associated with a first application, the communication request being used for requesting communication with a target user associated with the mini program;
   invoking a first mini program plug-in that is associated with a plurality of mini programs within an enterprise, according to the communication request, and communicating with the target user associated with the mini program through a first service function provided by the first mini program plug-in,
      wherein the mini program does not include the first mini program plug-in; and
   invoking a tool in response to a second trigger operation for a second service function provided by the first mini program plug-in in a process of communicating with the target user.

2. The data communication method according to claim 1, wherein the communicating comprises:
   displaying a communication waiting page through the first service function provided by the first mini program plug-in, wherein the communication waiting page comprises a cancel control;
   in response to a trigger operation for the cancel control on the communication waiting page, canceling a display of the communication waiting page, and transmitting a communication termination request to a backend server corresponding to the first mini program plug-in, so that the backend server cancels the communication request according to the communication termination request; and
   in response to a confirmation operation of the target user assigned by the first mini program plug-in on the communication waiting page, switching the communication waiting page to a communication call page, and communicating with the target user on the communication call page.

3. The data communication method according to claim 2, further comprising:
   switching the communication call page to a communication termination page in response to a trigger operation for a termination control on the communication call page;
   obtaining a user evaluation request transmitted by a target terminal through a user evaluation function provided by the first mini program plug-in on the communication termination page; and
   in response to a trigger operation for the user evaluation request, performing an evaluation operation for the target user, obtaining user evaluation information corresponding to the evaluation operation, and transmitting the user evaluation information to the target terminal through the user evaluation function.

4. The data communication method according to claim 2, wherein the second service function comprises a file uploading tool; and
   the invoking comprises:
   obtaining a file uploading request transmitted by a target terminal through the file uploading tool provided by the first mini program plug-in on the communication call page; and
   in response to a trigger operation for the file uploading request, performing a file uploading operation, obtaining a target file corresponding to the file uploading operation, and transmitting the target file to the target terminal through the file uploading tool in the process of communicating with the target user.

5. The data communication method according to claim 2, wherein the second service function comprises an image-text session tool; and
   the invoking comprises:
   obtaining an image-text confirmation request transmitted by a target terminal through the image-text session tool provided by the first mini program plug-in on the communication call page, wherein the image-text confirmation request carries to-be-confirmed image-text information; and
   in response to a trigger operation for the image-text confirmation request, performing a confirmation operation for the to-be-confirmed image-text information, obtaining an image-text confirmation reply message corresponding to the confirmation operation, and transmitting the image-text confirmation reply message to the target terminal through the image-text session tool in the process of communicating with the target user.

6. The data communication method according to claim 2, wherein the second service function comprises a video session tool; and
   the invoking comprises:
   obtaining a video session request transmitted by a target terminal through the video session tool provided by the first mini program plug-in on the communication call page; and
   in response to a trigger operation for the video session request, switching a communication manner on the communication call page to a video communication manner, and performing video communication with the target user in the video communication manner.

7. The data communication method according to claim 1, further comprising:
   generating a historical communication query request in response to a trigger operation for a historical communication query control, wherein the historical communication query request is used for requesting to query historical communication records between historical users associated with the mini program; and the historical users comprise the target user;

invoking the first mini program plug-in according to the historical communication query request, and transmitting the historical communication query request to a backend server corresponding to the first mini program plug-in through a communication record query function provided by the first mini program plug-in; and obtaining the historical communication records requested by the historical communication query request through the communication record query function.

8. A data communication apparatus, comprising:

at least one memory configured to store program code; and at least one processor configured to read the program code and operate as instructed by the program code, the program code comprising:

first response code configured to cause the at least one processor to generate a communication request in response to a first trigger operation in a mini program associated with a first application, the communication request being used for requesting communication with a target user associated with the mini program;

first invoking code configured to cause the at least one processor to invoke a first mini program plug-in that is associated with a plurality of mini programs within an enterprise, according to the communication request, and communicating with the target user associated with the mini program through a first service function provided by the first mini program plug-in, wherein the mini program does not include the first mini program plug-in; and second invoking code configured to cause the at least one processor to invoke a tool in response to a second trigger operation for a second service function provided by the first mini program plug-in in a process of communicating with the target user.

9. The data communication apparatus according to claim 8, wherein the first invoking code comprises:

display waiting code configured to cause the at least one processor to display a communication waiting page through the first service function provided by the first mini program plug-in, where the communication waiting page comprises a cancel control;

first transmission code configured to cause the at least one processor to, in response to a trigger operation for the cancel control on the communication waiting page, cancel a display of the communication waiting page, and transmit a communication termination request to a backend server corresponding to the first mini program plug-in, so that the backend server cancels the communication request according to the communication termination request; and first switching code configured to cause the at least one processor to, in response to a confirmation operation of the target user assigned by the first mini program plug-in on the communication waiting page, switch the communication waiting page to a communication call page, and communicate with the target user on the communication call page.

10. The data communication apparatus according to claim 9, wherein the first invoking code further comprises:

second switching code configured to cause the at least one processor to switch the communication call page to a communication termination page in response to a trigger operation for a termination control on the communication call page;

first obtaining code configured to cause the at least one processor to obtain a user evaluation request transmitted by a target terminal through a user evaluation function provided by the first mini program plug-in on the communication termination page; and second obtaining code configured to cause the at least one processor to, in response to a trigger operation for the user evaluation request, perform an evaluation operation for the target user, obtain user evaluation information corresponding to the evaluation operation, and transmit the user evaluation information to the target terminal through the user evaluation function.

11. The data communication apparatus according to claim 9, wherein the second service function comprises a file uploading tool; and the second invoking code comprises:

third obtaining code configured to cause the at least one processor to obtain a file uploading request transmitted by a target terminal through the file uploading tool provided by the first mini program plug-in on the communication call page; and second transmission code configured to cause the at least one processor to, in response to a trigger operation for the file uploading request, perform a file uploading operation, obtain a target file corresponding to the file uploading operation, and transmit the target file to the target terminal through the file uploading tool in the process of communicating with the target user.

12. The data communication apparatus according to claim 9, wherein the second service function comprises an image-text session tool; and the second invoking code comprises:

fourth obtaining code configured to cause the at least one processor to obtain an image-text confirmation request transmitted by a target terminal through the image-text session tool provided by the first mini program plug-in on the communication call page, where the image-text confirmation request carries to-be-confirmed image-text information; and third transmission code configured to cause the at least one processor to, in response to a trigger operation for the image-text confirmation request, perform a confirmation operation for the to-be-confirmed image-text information, obtain an image-text confirmation reply message corresponding to the confirmation operation, and transmit the image-text confirmation reply message to the target terminal through the image-text session tool in the process of communicating with the target user.

13. The data communication apparatus according to claim 9, wherein the second service function comprises a video session tool; and the second invoking code comprises:

fifth obtaining code configured to cause the at least one processor to obtain a video session request transmitted by a target terminal through the video session tool provided by the first mini program plug-in on the communication call page; and third switching code configured to cause the at least one processor to, in response to a trigger operation for the video session request, switch a communication manner on the communication call page to a video communication manner, and perform video communication with the target user in the video communication manner.

14. The data communication apparatus according to claim 8, wherein the program code further comprises:
- third response code configured to cause the at least one processor to generate a historical communication query request in response to a trigger operation for a historical communication query control, where the historical communication query request is used for requesting to query historical communication records between historical users associated with the mini program; and the historical users comprise the target user;
- third invoking code configured to cause the at least one processor to invoke the first mini program plug-in according to the historical communication query request, and transmit the historical communication query request to a backend server corresponding to the first mini program plug-in through a communication record query function provided by the first mini program plug-in; and
- record obtaining code configured to cause the at least one processor to obtain the historical communication records requested by the historical communication query request through the communication record query function.

15. A non-transitory computer-readable storage medium, storing computer code that when executed by at least one processor causes the at least one processor to:
- generate a communication request in response to a first trigger operation in a mini program associated with a first application, the communication request being used for requesting communication with a target user associated with the mini program;
- invoke a first mini program plug-in that is associated with a plurality of mini programs within an enterprise, according to the communication request, and communicating with the target user associated with the mini program through a first service function provided by the first mini program plug-in,
  - wherein the mini program does not include the first mini program plug-in; and
- invoke a tool in response to a second trigger operation for a second service function provided by the first mini program plug-in in a process of communicating with the target user.

16. The non-transitory computer-readable storage medium according to claim 15, wherein the communicating with the target user comprises:
- displaying a communication waiting page through the first service function provided by the first mini program plug-in, wherein the communication waiting page comprises a cancel control;
- in response to a trigger operation for the cancel control on the communication waiting page, canceling a display of the communication waiting page, and transmitting a communication termination request to a backend server corresponding to the first mini program plug-in, so that the backend server cancels the communication request according to the communication termination request; and
- in response to a confirmation operation of the target user assigned by the first mini program plug-in on the communication waiting page, switching the communication waiting page to a communication call page, and communicating with the target user on the communication call page.

17. The non-transitory computer-readable storage medium according to claim 16, the computer code is further configured to cause the at least one processor to:
- switch the communication call page to a communication termination page in response to a trigger operation for a termination control on the communication call page;
- obtain a user evaluation request transmitted by a target terminal through a user evaluation function provided by the first mini program plug-in on the communication termination page; and
- in response to a trigger operation for the user evaluation request, perform an evaluation operation for the target user, obtain user evaluation information corresponding to the evaluation operation, and transmit the user evaluation information to the target terminal through the user evaluation function.

18. The non-transitory computer-readable storage medium according to claim 16, wherein the second service function comprises a file uploading tool; and
- the invoking the file uploading tool comprises:
  - obtaining a file uploading request transmitted by a target terminal through the file uploading tool provided by the first mini program plug-in on the communication call page; and
  - in response to a trigger operation for the file uploading request, performing a file uploading operation, obtaining a target file corresponding to the file uploading operation, and transmitting the target file to the target terminal through the file uploading tool in the process of communicating with the target user.

19. The non-transitory computer-readable storage medium according to claim 16, wherein the second service function comprises an image-text session tool; and
- the invoking the image-text session tool comprises:
  - obtaining an image-text confirmation request transmitted by a target terminal through the image-text session tool provided by the first mini program plug-in on the communication call page, wherein the image-text confirmation request carries to-be-confirmed image-text information; and
  - in response to a trigger operation for the image-text confirmation request, performing a confirmation operation for the to-be-confirmed image-text information, obtaining an image-text confirmation reply message corresponding to the confirmation operation, and transmitting the image-text confirmation reply message to the target terminal through the image-text session tool in the process of communicating with the target user.

20. The non-transitory computer-readable storage medium according to claim 16, wherein the second service function comprises a video session tool; and
- the invoking the video session tool comprises:
  - obtaining a video session request transmitted by a target terminal through the video session tool provided by the first mini program plug-in on the communication call page; and
  - in response to a trigger operation for the video session request, switching a communication manner on the communication call page to a video communication manner, and performing video communication with the target user in the video communication manner.

\* \* \* \* \*